United States Patent
Liu et al.

(10) Patent No.: US 12,294,997 B2
(45) Date of Patent: May 6, 2025

(54) SIDELINK TRANSMISSIONS USING RECEIVER FEEDBACK

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 564 days.

(21) Appl. No.: 17/538,510

(22) Filed: Nov. 30, 2021

(65) Prior Publication Data

US 2023/0171774 A1  Jun. 1, 2023

(51) Int. Cl.
| | |
|---|---|
| *H04W 4/40* | (2018.01) |
| *H04L 1/1607* | (2023.01) |
| *H04W 72/0446* | (2023.01) |
| *H04W 72/20* | (2023.01) |
| *H04W 74/0808* | (2024.01) |

(52) U.S. Cl.
CPC .......... *H04W 72/20* (2023.01); *H04L 1/1607* (2013.01); *H04W 72/0446* (2013.01); *H04W 74/0808* (2013.01)

(58) Field of Classification Search
CPC ... H04W 4/40; H04W 72/20; H04W 72/0446; H04W 72/40; H04W 28/02; H04W 4/46; H04W 4/44; H04W 92/20; H04W 84/18; H04W 72/25
See application file for complete search history.

(56) References Cited

U.S. PATENT DOCUMENTS

2020/0022089 A1* 1/2020 Guo ...................... H04L 1/1812

FOREIGN PATENT DOCUMENTS

CN  115362727 A  * 11/2022  ........... H04L 1/1607

* cited by examiner

*Primary Examiner* — Tu X Nguyen
(74) *Attorney, Agent, or Firm* — Arun Swain

(57) ABSTRACT

Various aspects of the present disclosure generally relate to wireless communication. In some aspects, a receiver may receive, from two or more transmitters, two or more sidelink control informations (SCIs) that schedule channel occupancy time (COT) resources for the two or more transmitters. The receiver may transmit, to a transmitter of the two or more transmitters, an acknowledgement or negative acknowledgement (A/N) feedback via a mini-slot carrying a physical sidelink feedback channel (PSFCH) or sidelink feedback information (SLFI) with SCI. The A/N feedback may be transmitted before a listen-before-talk (LBT) and physical sidelink shared channel (PSSCH) transmission. The receiver may receive, from the transmitter using a COT resource, the PSSCH transmission based at least in part on the A/N feedback. The LBT and the PSSCH transmission may be adjustable at the transmitter based at least in part on the A/N feedback. Numerous other aspects are described.

30 Claims, 17 Drawing Sheets

SIDELINK TRANSMISSIONS USING RECEIVER FEEDBACK

FIELD OF THE DISCLOSURE

Aspects of the present disclosure generally relate to wireless communication and to techniques and apparatuses for sidelink transmissions using receiver feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a receiver includes a memory and one or more processors, coupled to the memory, configured to: receive, from two or more transmitters, two or more sidelink control informations (SCIs) that schedule channel occupancy time (COT) resources for the two or more transmitters, wherein the two or more SCIs are associated with a same mini-slot or slot; transmit, to a transmitter of the two or more transmitters and based at least in part on the two or more SCIs, an acknowledgement or negative acknowledgement (A/N) feedback via a time division multiplexed or a frequency division multiplexed mini-slot carrying a physical sidelink feedback channel (PSFCH) or sidelink feedback information (SLFI) with SCI, wherein the A/N feedback is transmitted before a listen-before-talk (LBT) and physical sidelink shared channel (PSSCH) transmission; and receive, from the transmitter using a COT resource, the PSSCH transmission based at least in part on the A/N feedback, wherein the LBT and the PSSCH transmission are adjustable at the transmitter based at least in part on the A/N feedback.

In some implementations, an apparatus for wireless communication at a transmitter includes a memory and one or more processors, coupled to the memory, configured to: transmit, to a receiver, SCI that schedules COT resources for the receiver, wherein the SCI is included in two or more SCIs that are received at the receiver and are associated with a same mini-slot or slot; receive, from the receiver and based at least in part on the two or more SCIs, an A/N feedback via a time division multiplexed or a frequency division multiplexed mini-slot carrying a PSFCH or SLFI with SCI, wherein the A/N feedback is received before an LBT and PSSCH transmission; and transmit, to the receiver using a COT resource, the PSSCH transmission based at least in part on the A/N feedback, wherein the LBT and the PSSCH transmission are adjustable at the transmitter based at least in part on the A/N feedback.

In some implementations, a method of wireless communication performed by a receiver includes receiving, from two or more transmitters, two or more SCIs that schedule COT resources for the two or more transmitters, wherein the two or more SCIs are associated with a same mini-slot or slot; transmitting, to a transmitter of the two or more transmitters and based at least in part on the two or more SCIs, an A/N feedback via a time division multiplexed or a frequency division multiplexed mini-slot carrying a PSFCH or SLFI with SCI, wherein the A/N feedback is transmitted before an LBT and PSSCH transmission; and receiving, from the transmitter using a COT resource, the PSSCH transmission based at least in part on the A/N feedback, wherein the LBT and the PSSCH transmission are adjustable at the transmitter based at least in part on the A/N feedback.

In some implementations, a method of wireless communication performed by a transmitter includes transmitting, to a receiver, SCI that schedules COT resources for the receiver, wherein the SCI is included in two or more SCIs that are received at the receiver and are associated with a same mini-slot or slot; receiving, from the receiver and based at least in part on the two or more SCIs, an A/N feedback via a time division multiplexed or a frequency division multiplexed mini-slot carrying a PSFCH or SLFI with SCI, wherein the A/N feedback is received before an LBT and PSSCH transmission; and transmitting, to the receiver using a COT resource, the PSSCH transmission based at least in part on the A/N feedback, wherein the LBT and the PSSCH transmission are adjustable at the transmitter based at least in part on the A/N feedback.

In some implementations, a non-transitory computer-readable medium storing a set of instructions for wireless communication includes one or more instructions that, when executed by one or more processors of a receiver, cause the receiver to: receive, from two or more transmitters, two or more SCIs that schedule COT resources for the two or more transmitters, wherein the two or more SCIs are associated with a same mini-slot or slot; transmit, to a transmitter of the two or more transmitters and based at least in part on the two or more SCIs, an A/N feedback via a time division multiplexed or a frequency division multiplexed mini-slot carrying a PSFCH or SLFI with SCI, wherein the A/N feedback is transmitted before an LBT and PSSCH transmission; and receive, from the transmitter using a COT resource, the PSSCH transmission based at least in part on the A/N feedback, wherein the LBT and the PSSCH transmission are adjustable at the transmitter based at least in part on the A/N feedback.

In some implementations, a non-transitory computer-readable medium storing a set of instructions for wireless communication includes one or more instructions that, when executed by one or more processors of a transmitter, cause the transmitter to: transmit, to a receiver, SCI that schedules COT resources for the receiver, wherein the SCI is included in two or more SCIs that are received at the receiver and are associated with a same mini-slot or slot; receive, from the receiver and based at least in part on the two or more SCIs, an A/N feedback via a time division multiplexed or a frequency division multiplexed mini-slot carrying a PSFCH or SLFI with SCI, wherein the A/N feedback is received before an LBT and PSSCH transmission; and transmit, to the receiver using a COT resource, the PSSCH transmission based at least in part on the A/N feedback, wherein the LBT and the PSSCH transmission are adjustable at the transmitter based at least in part on the A/N feedback.

In some implementations, an apparatus for wireless communication includes means for receiving, from two or more transmitters, two or more SCIs that schedule COT resources for the two or more transmitters, wherein the two or more SCIs are associated with a same mini-slot or slot; means for transmitting, to a transmitter of the two or more transmitters and based at least in part on the two or more SCIs, an A/N feedback via a time division multiplexed or a frequency division multiplexed mini-slot carrying a PSFCH or SLFI with SCI, wherein the A/N feedback is transmitted before an LBT and PSSCH transmission; and means for receiving, from the transmitter using a COT resource, the PSSCH transmission based at least in part on the A/N feedback, wherein the LBT and the PSSCH transmission are adjustable at the transmitter based at least in part on the A/N feedback.

In some implementations, an apparatus for wireless communication includes means for transmitting, to a receiver, SCI that schedules COT resources for the receiver, wherein the SCI is included in two or more SCIs that are received at the receiver and are associated with a same mini-slot or slot; means for receiving, from the receiver and based at least in part on the two or more SCIs, an A/N feedback via a time division multiplexed or a frequency division multiplexed mini-slot carrying a PSFCH or SLFI with SCI, wherein the A/N feedback is received before an LBT and PSSCH transmission; and means for transmitting, to the receiver using a COT resource, the PSSCH transmission based at least in part on the A/N feedback, wherein the LBT and the PSSCH transmission are adjustable at the apparatus based at least in part on the A/N feedback.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
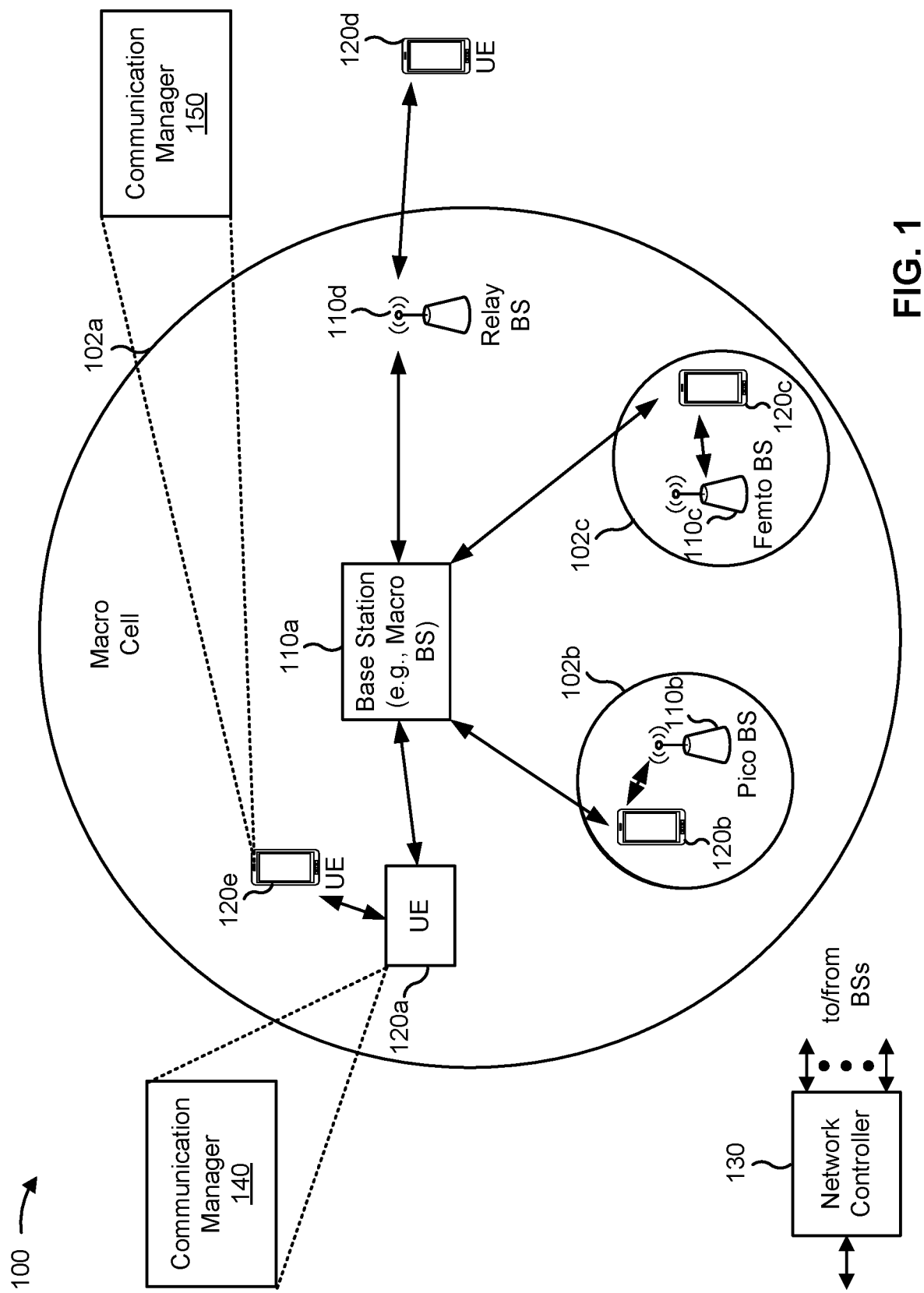
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a receiver (e.g., UE 120a) may include a communication manager 140. As described in more detail elsewhere herein, the communication manager 140 may receive, from two or more transmitters, two or more sidelink control informations (SCIs) that schedule channel occupancy time (COT) resources for the two or more transmitters, wherein the two or more SCIs are associated with a same mini-slot or slot; transmit, to a transmitter of the two or more transmitters and based at least in part on the two or more SCIs, an acknowledgement or negative acknowledgement (A/N) feedback via a time division multiplexed or a frequency division multiplexed mini-slot carrying a physical sidelink feedback channel (PSFCH) or sidelink feedback information (SLFI) with SCI, wherein the A/N feedback is transmitted before a listen-before-talk (LBT) and physical sidelink shared channel (PSSCH) transmission; and receive, from the transmitter using a COT resource, the PSSCH transmission based at least in part on the A/N feedback, wherein the LBT and the PSSCH transmission are adjustable at the transmitter based at least in part on the A/N feedback. Additionally, or alternatively, the communication manager 140 may perform one or more other operations described herein.

In some aspects, a transmitter (e.g., UE 120e) may include a communication manager 150. As described in more detail elsewhere herein, the communication manager 150 may transmit, to a receiver, SCI that schedules COT resources for the receiver, wherein the SCI is included in two or more SCIs that are received at the receiver and are associated with a same mini-slot or slot; receive, from the receiver and based at least in part on the two or more SCIs, an A/N feedback via a time division multiplexed or a frequency division multiplexed mini-slot carrying a PSFCH or SLFI with SCI, wherein the A/N feedback is received before an LBT and PSSCH transmission; and transmit, to the receiver using a COT resource, the PSSCH transmission based at least in part on the A/N feedback, wherein the LBT and the PSSCH transmission are adjustable at the transmitter based at least in part on the A/N feedback. Additionally, or alternatively, the communication manager 150 may perform one or more other operations described herein.

As indicated above, FIG. 1 is provided as an example. Other examples may differ from what is described with regard to FIG. 1.

Figure 2:
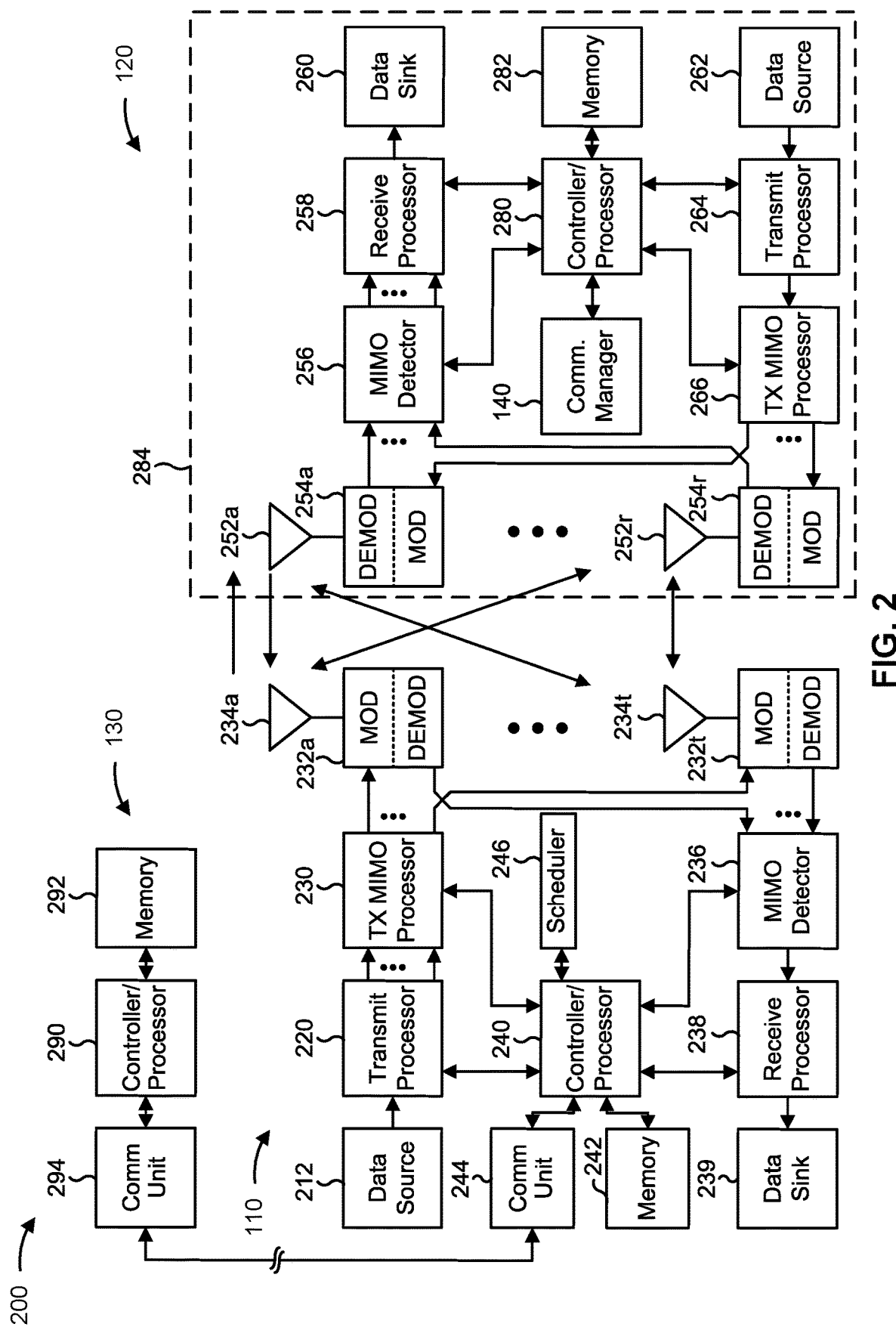
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-17).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-17).

The controller/processor 240 of the base station 110, the controller/processor 280 of the UE 120, and/or any other component(s) of FIG. 2 may perform one or more techniques associated with sidelink transmissions using receiver feedback, as described in more detail elsewhere herein. In some aspects, the receiver described herein is the UE 120 (e.g., UE 120*a*), is included in the UE 120, or includes one or more components of the UE 120 shown in FIG. 2. In some aspects, the transmitter described herein is the UE 120 (e.g., UE 120*e*), is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 1400 of FIG. 14, process 1500 of FIG. 15, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1400 of FIG. 14, process 1500 of FIG. 15, and/or other processes as described herein. In some examples, executing instructions may include running the instructions, converting the instructions, compiling the instructions, and/or interpreting the instructions, among other examples.

In some aspects, a receiver (e.g., UE 120*a*) includes means for receiving, from two or more transmitters, two or more SCIs that schedule COT resources for the two or more transmitters, wherein the two or more SCIs are associated with a same mini-slot or slot; means for transmitting, to a transmitter of the two or more transmitters and based at least in part on the two or more SCIs, an A/N feedback via a time division multiplexed or a frequency division multiplexed mini-slot carrying a PSFCH or SLFI with SCI, wherein the A/N feedback is transmitted before an LBT and PSSCH transmission; and/or means for receiving, from the transmitter using a COT resource, the PSSCH transmission based at least in part on the A/N feedback, wherein the LBT and the PSSCH transmission are adjustable at the transmitter based at least in part on the A/N feedback. In some aspects, the means for the receiver to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a transmitter (e.g., transmitter 120*e*) includes means for transmitting, to a receiver, SCI that schedules COT resources for the receiver, wherein the SCI is included in two or more SCIs that are received at the receiver and are associated with a same mini-slot or slot; means for receiving, from the receiver and based at least in part on the two or more SCIs, an A/N feedback via a time division multiplexed or a frequency division multiplexed mini-slot carrying a PSFCH or SLFI with SCI, wherein the A/N feedback is received before an LBT and PSSCH transmission; and/or means for transmitting, to the receiver using a COT resource, the PSSCH transmission based at least in part on the A/N feedback, wherein the LBT and the PSSCH transmission are adjustable at the transmitter based at least in part on the A/N feedback. In some aspects, the means for the transmitter to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In a sidelink, a transmitter may not transmit a PSSCH in a data resource pool (RP) when a receiver detects a collision in SCI, which may solve a collision problem in a control resource pool. A collision in the control resource plane may have a smaller overhead as compared with a collision in the data resource pool. The transmitter may send a scheduling SCI in a mini-slot control resource pool ahead of an associated PSSCH. The scheduling SCI, such as a sidelink control information stage one (SCI-1), may indicate a source identifier and a destination identifier. The transmitter may also reserve future resources for a mini-slot SCI retransmission to handle possible collisions. The receiver may monitor a mini-slot collision and transmit an A/N in a mini-slot PSFCH. The receiver may estimate an interference level based at least in part on a sidelink PSSCH DMRS in the control resource pool. The receiver may transmit an A/N based at least in part on the interference level. When a mini-slot SCI is confirmed, the transmitter may transmit the PSSCH based at least in part on a time domain resource allocation (TDRA) or a frequency domain resource allocation.

As an example, four mini-slots may be equal to one slot. However, in some cases, more than four mini-slots or less than four mini-slots may correspond to one slot.

Figure 3:
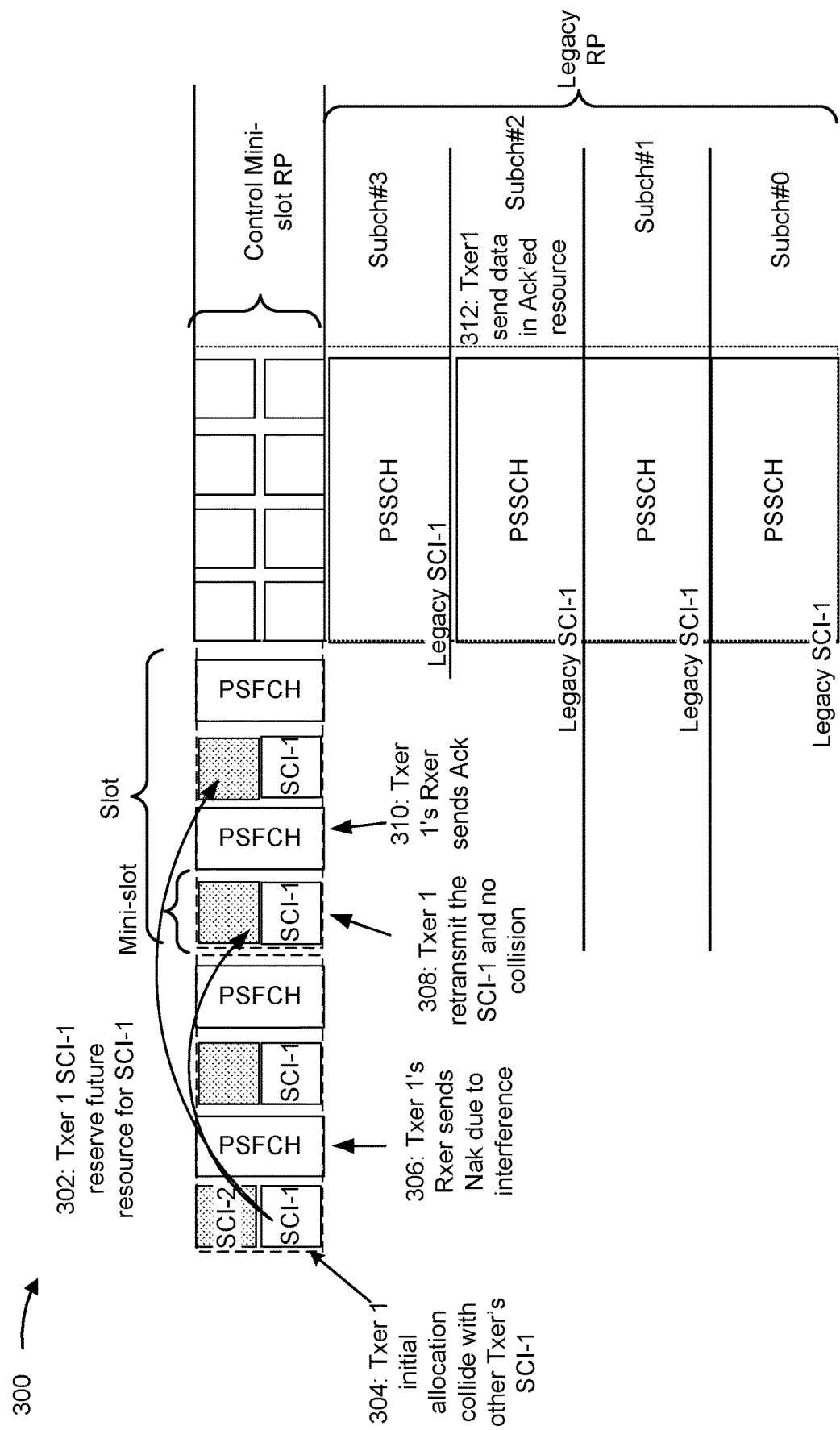
FIG. 3 is a diagram illustrating an example of sidelink communications, in accordance with the present disclosure.

FIG. 3 is a diagram illustrating an example 300 of sidelink communications, in accordance with the present disclosure.

As shown by reference number 302, a transmitter (Txer 1) may transmit an SCI-1 to reserve future resources for SCI-1s. As shown by reference number 304, an initial allocation associated with the transmitter may collide with another transmitter's SCI-1. As shown by reference number 306, the transmitter's receiver (Rxer) may transmit a negative acknowledgement (NACK) due to interference. As shown by reference number 308, the transmitter may retransmit the SCI-1 and no collision may occur. As shown by reference number 310, the transmitter's receiver may transmit an acknowledgement (ACK). As shown by reference number 312, the transmitter may send data in an acknowledged resource. The transmitter may send the data via a PSSCH, which may be associated with a subchannel of a resource pool.

As indicated above, FIG. 3 is provided as an example. Other examples may differ from what is described with regard to FIG. 3.

The SCI-1 may indicate various control information used for sidelink communications. The control information may include an indication of one or more resources (e.g., time resources, frequency resources, and/or spatial resources) where various types of information may be carried on a PSSCH, information for decoding sidelink communications on the PSSCH, a quality of service (QoS) priority value, a resource reservation period, a PSSCH DMRS pattern, an SCI format and a beta offset for sidelink control information stage 2 (SCI-2) transmitted on the PSSCH, a quantity of PSSCH DMRS ports, and/or an MCS. The SCI-2 may include various types of information, such as a hybrid automatic repeat request (HARD) process ID, a new data indicator (NDI) associated with data, a source identifier, a destination identifier, and/or a channel state information (CSI) report trigger.

A control resource pool in a licensed anchor channel may be used to provide COT resource coordination, so that multiple transmitters (e.g., sidelink transmitters) may start a category 4 (CAT 4) LBT at a same time. An SCI-1 may indicate starting positions and a TDRA and/or frequency domain resource allocation (FDRA) of COT resources. Sidelink channel sensing and resource selection may be performed in the licensed anchor carrier to coordinate COT resource collision in an unlicensed carrier. LBT only in the unlicensed carrier and overloading multiple transmitters on an overlapping COT resource may achieve multi-UE LBT diversity. Partial LBT subband frequency division multiplexed transmitters may start LBT at a same time with different interlaces. Full LBT subband time division multiplexed transmitters may start LBT at a same time with different starting positions.

Figure 4:
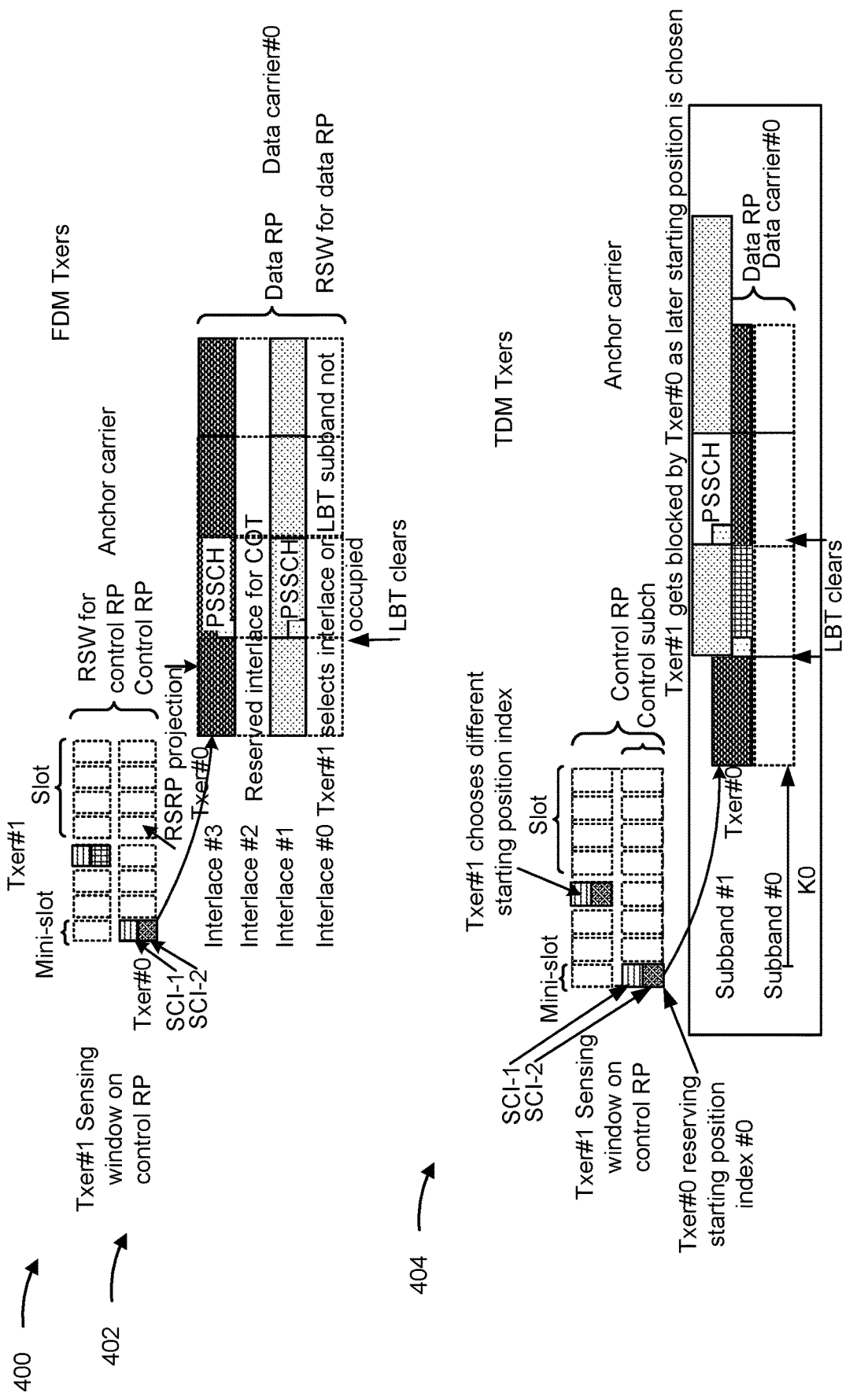
FIG. 4 is a diagram illustrating an example of frequency division multiplexed transmitters and time division multiplexed transmitters, in accordance with the present disclosure.

FIG. 4 is a diagram illustrating an example 400 of frequency division multiplexed transmitters and time division multiplexed transmitters, in accordance with the present disclosure.

As shown by reference number 402, with respect to frequency division multiplexed transmitters, partial LBT subband frequency division multiplexed transmitters may start LBT at a same time with different interlaces. A transmitter may select an interlace or LBT subband that is not occupied. The transmitter may select the interlace or LBT subband based at least in part on an SCI, which may be associated with a transmitter sensing window on a control resource pool. The SCI may be associated with an anchor carrier. Different transmitters may reserve different interlaces for a COT.

As shown by reference number 404, with respect to time division multiplexed transmitters, full LBT subband time division multiplexed transmitters may start LBT at a same time with different starting positions. A transmitter may choose a different starting position index, but the transmitter may be blocked by another transmitted based on the transmitter choosing a later starting position.

As indicated above, FIG. 4 is provided as an example. Other examples may differ from what is described with regard to FIG. 4.

Figure 5:
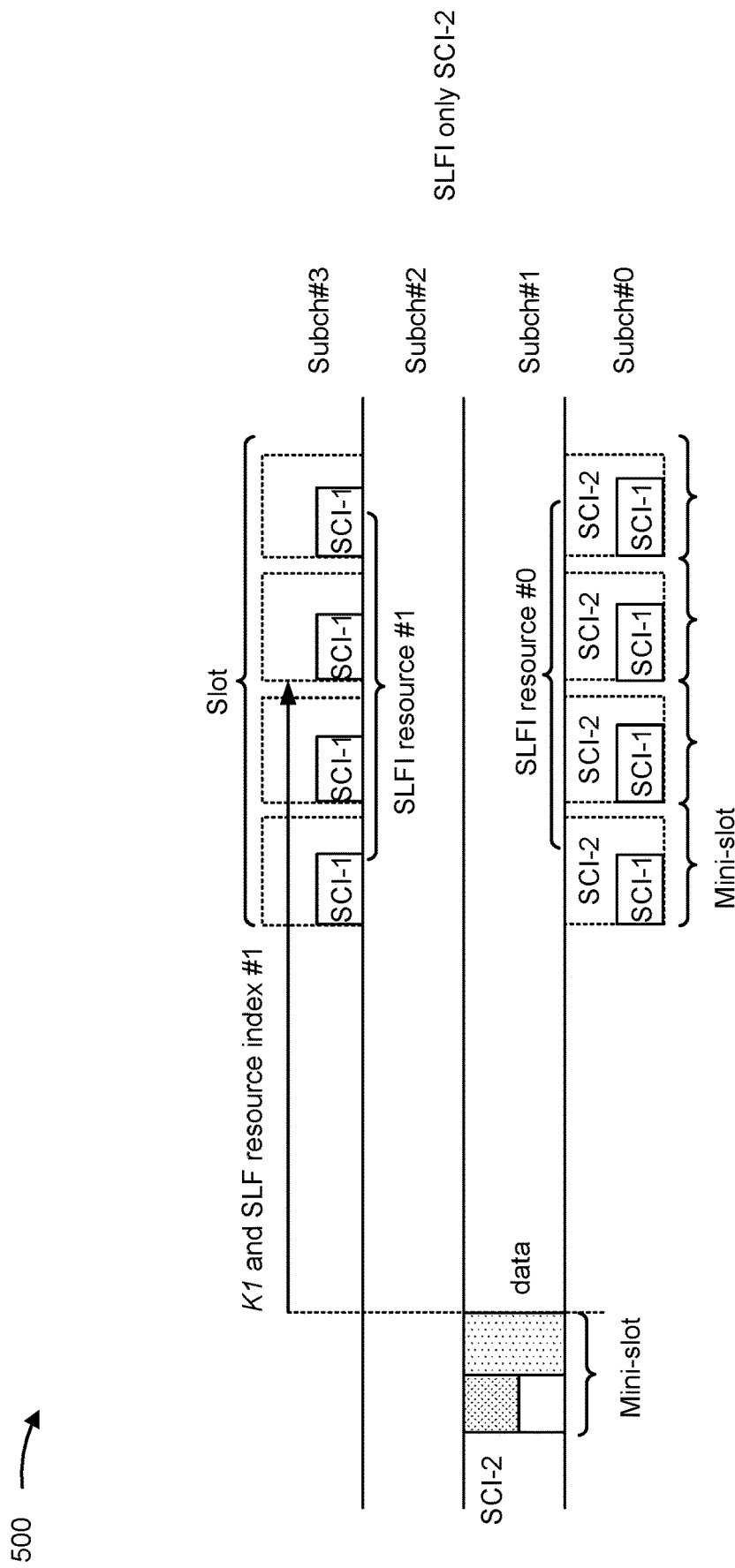
FIG. 5 is a diagram illustrating an example of a mini-slot sidelink control information (SCI), in accordance with the present disclosure.

FIG. 5 is a diagram illustrating an example 500 of a mini-slot SCI, in accordance with the present disclosure.

As shown in FIG. 5, a mini-slot SCI may carry multi-bits AN and/or CSI. A mini-slot sidelink control information stage two (SCI-2) may carry SLFI. A mini-slot SCI-1 may carry SLFI. An SLFI resource configuration may be associated with a mini-slot or a slot-based resource pool, and an SLFI resource mapping may be defined in subchannels or mini-slots. A data scheduling mini-slot SCI-2 may carry a K1 value and SLFI resource indication for a HARQ and CSI report. Further, a transmitter may assign orthogonal SLFI resource for a receiver associated with the transmitter.

As indicated above, FIG. 5 is provided as an example. Other examples may differ from what is described with regard to FIG. 5.

A channel sensing and resource selection may be performed in the case of decoupled control and data resource pools. As a K0 value may be greater than zero (e.g., from a scheduling SCI to a PSSCH), after a transmitter performs a last-minute evaluation during a transmitter sensing window, the transmitter may have a sufficient timeline to modify the scheduling SCI's TDRA or FDRA or starting position and PSSCH accordingly. In a legacy sidelink SCI may be transmitted alone with the PSSCH, and the transmitter may not have sufficient time to modify both the SCI and the PSSCH. After the SCI is transmitted and before the PSSCH is transmitted, additional information on resource usage may be collected and may be used to improve a resource utilization.

A COT resource collision may be detected after the scheduling SCI is transmitted but before a PSSCH transmission. After the scheduling SCI is transmitted, the transmitter may continue to detect a colliding FDRA or a starting position allocation for a COT reservation from other transmitters before an actual PSSCH transmission.

Figure 6:
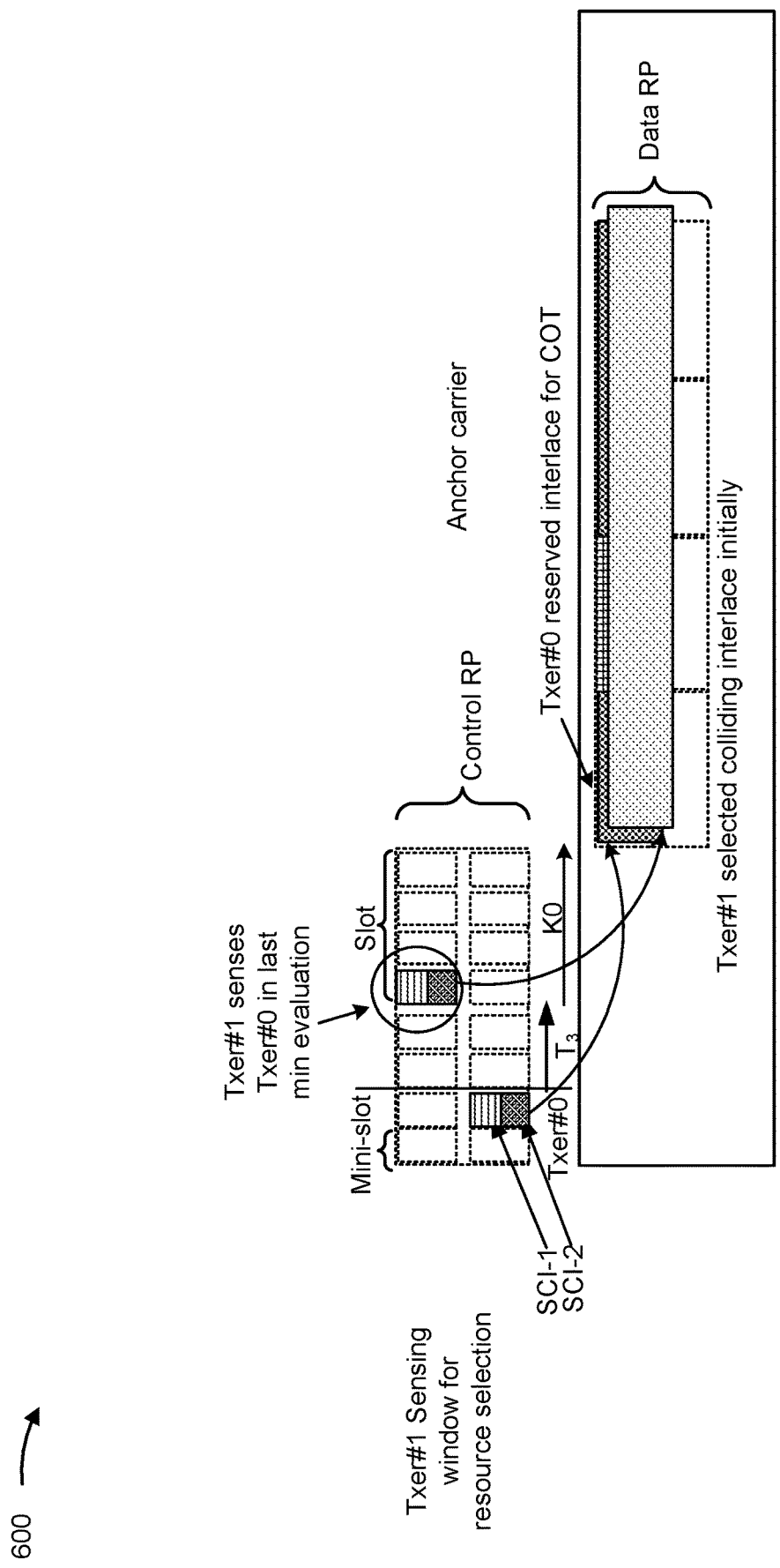
FIG. 6 is a diagram illustrating an example of collision detection, in accordance with the present disclosure.

FIG. 6 is a diagram illustrating an example 600 of collision detection, in accordance with the present disclosure.

As shown in FIG. 6, a first transmitter (Txer #0) may reserve an interlace for a COT. A second transmitter (Txer #1) may initially select a colliding interface, with respect to the interlace reserved by the first transmitter. The second transmitter may sense a collision associated with the first transmitter in a last-minute evaluation. The second transmitter may sense the collision during a transmitter sensing window for resource selection. The second transmitter may perform a resource utilization decision based at least in part on the sensed collision.

As indicated above, FIG. 6 is provided as an example. Other examples may differ from what is described with regard to FIG. 6.

An SCI mini-slot resource collision may occur in a control resource pool, in which case an unnecessary PSSCH transmission and LBT may be prevented in a data resource pool. A receiver may detect an SCI collision in a same mini-slot and control subchannel of the control resource pool and report a NACK via a PSFCH to gate (or control) the PSSCH transmission and the LBT, when an interference level measured via a physical sidelink control channel (PSCCH) or PSSCH DMRS satisfies a threshold.

One problem involves transmitter deafness with two transmitters transmitting two SCI-1s in a same mini-slot but in different control subchannels (in sub-6 GHz). The two transmitters may not hear each other's scheduling colliding COT resource when the two SCI-1s are transmitted in the same mini-slot (in the same or different control subchannel). When the two SCI-1s are sent in different mini-slots, each transmitter may detect a scheduling COT resource collision via a transmitter sensing.

Figure 7:
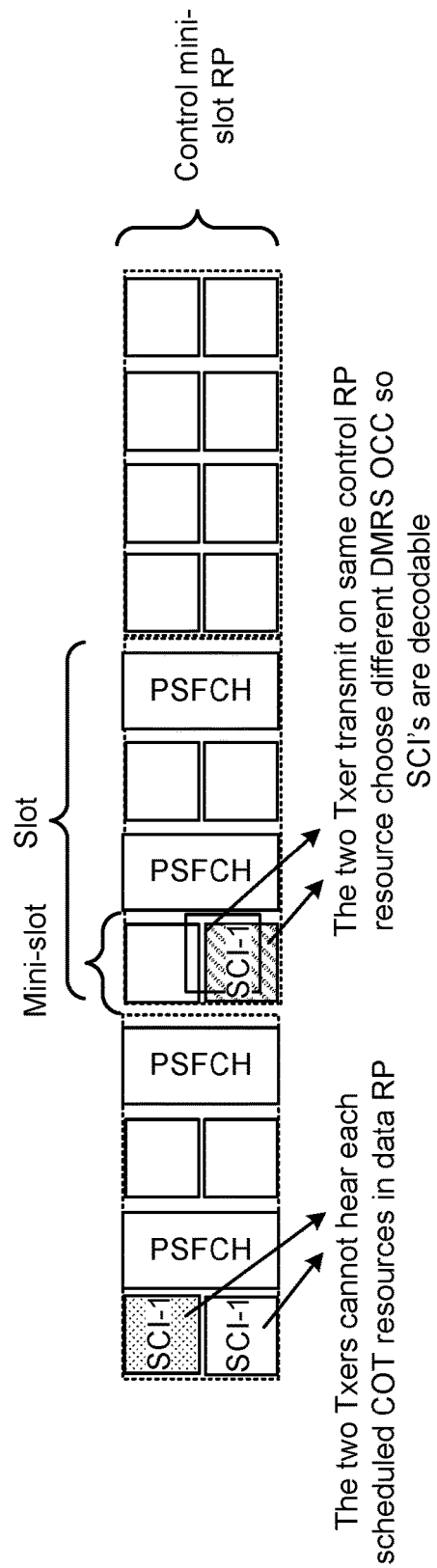
FIGS. 7-8 are diagrams illustrating examples of transmitter deafness, in accordance with the present disclosure.

FIG. 7 is a diagram illustrating an example 700 of transmitter deafness, in accordance with the present disclosure.

As shown in FIG. 7, two transmitters may not detect each other's scheduled COT resources in a data resource pool. The two transmitters may transmit two SCI-1s in a same mini-slot but in different control subchannels. In some cases, the two transmitters transmitting on a same resource of a control resource pool may select different DMRS orthogonal cover codes (OCCs), such that the two SCI-1s may be decodable.

As indicated above, FIG. 7 is provided as an example. Other examples may differ from what is described with regard to FIG. 7.

In a mmW system, SCIs in a control resource pool may also be beamformed and two transmitters may not hear the other transmitter's SCI (even in different mini-slots). However, a receiver's PSSCH reception may be jammed when the two transmitters transmit over overlapping PSSCH resources. In some cases, two SCIs transmitted in a same mini-slot and control subchannel may still be decodable at the receiver (sub-6 GHz), in which case an SCI collision may occur and a PSSCH transmission may be gated to control waste and data resources. Two spatially separated transmitters' SCIs may be decodable by the receiver with spatial nulling. Additional receiver sensing information may assist the transmitters. Two time division multiplexed transmitters may select a same starting position. The receiver may suggest, via a multi-bit PSFCH or an SLFI only uplink control information (UCI), a starting position change for the time division multiplexed transmitters when the two transmitters are colliding. The receiver may provide the transmitters with SCI sensing results, which may be obtained at the receiver, to further assist the transmitters on data resource selection.

Figure 8:
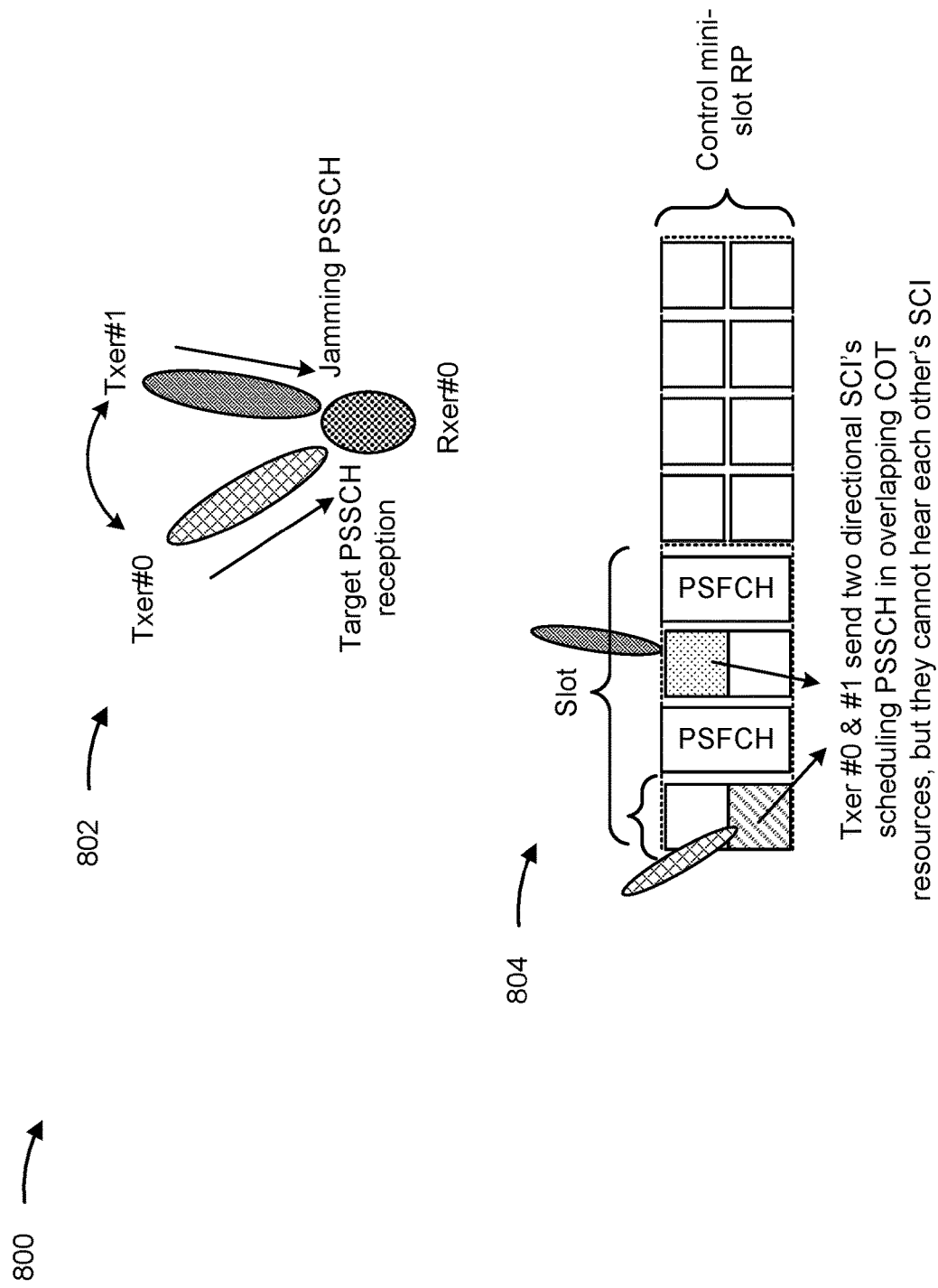

FIG. 8 is a diagram illustrating an example 800 of transmitter deafness, in accordance with the present disclosure.

As shown by reference number 802, a first transmitter (Txer #0) and a second transmitter (Txer #1) may transmit a first PSSCH and a second PSSCH, respectively, over overlapping PSSCH resources. The first transmitter may transmit the first PSSCH using a first beam, and the second transmitter may transmit the second PSSCH using a second beam. The first PSSCH may be associated with a target PSSCH reception and the second PSSCH may be a jamming PSSCH. The first transmitter and the second transmitter may be unable to hear each other's SCIs via sensing. A receiver PSSCH reception may be jammed when the first transmitter and the second transmitter transmit over the overlapping PSSCH resources.

As shown by reference number 804, the first transmitter and the second transmitter may transmit two directional SCIs to schedule a PSSCH in overlapping COT resources. However, the first transmitter and the second transmitter may be unable to hear each other's SCI.

As indicated above, FIG. 8 is provided as an example. Other examples may differ from what is described with regard to FIG. 8.

Transmitter deafness may result with two transmitters transmitting two SCI-1s in a same mini-slot but in different control subchannels (in sub-6 GHz). The two transmitters may not hear each other's scheduling colliding COT resource when the two SCI-1s are transmitted in the same mini-slot (in the same or different control subchannel). Further, SCIs in a control resource pool may also be beamformed and two transmitters may not hear the other transmitter's SCI (even in different mini-slots). A receiver's PSSCH reception may be jammed when the two transmitters transmit over overlapping PSSCH resources. As a result, collisions between overlapping PSSCH resources may negatively affect a performance of the transmitters and the receiver.

In various aspects of techniques and apparatuses described herein, a receiver may receive, from two or more transmitters, two or more SCIs that schedule COT resources for the two or more transmitters. The two or more SCIs may be associated with a same mini-slot or slot. The receiver may transmit, to a transmitter of the two or more transmitters and based at least in part on the two or more SCIs, an A/N feedback via a time division multiplexed or a frequency division multiplexed mini-slot carrying a PSFCH or SLFI with SCI. The receiver may transmit the A/N feedback before an LBT at the transmitter and before a PSSCH transmission from the transmitter. The receiver may receive, from the transmitter using a COT resource, the PSSCH transmission based at least in part on the A/N feedback. The transmitter may adjust the LBT and the PSSCH transmission based at least in part on the A/N feedback. In some aspects, the A/N feedback from the receiver may enable to perform the LBT and the PSSCH transmission. For example, based at least in part on the A/N feedback indicating a presence of colliding COT resources between the two or more transmitters, the transmitter may adjust the LBT and the PSSCH transmission accordingly to avoid the colliding COT resources.

In some aspects, a receiver assisted resource scheduling/reservation may be based at least in part on the receiver's SCI sensing in a receiver sensing window to detect two SCIs that schedule on conflicting COT resources, which may solve a transmitter sensing deafness problem due to a half-duplex or beamformed SCI in a mmW system. The receiver may control the transmitter's PSSCH transmission via a PSFCH or an SLFI, to avoid a PSSCH transmission collision, by detecting a collision of scheduled COT resources indicated in two SCI-1s. The SLFI may carry receiver sensing results on a colliding FDRA or TDRA or starting position to assist the transmitter's resource selection or PSSCH starting position adjustment. Further, an additional last-minute evaluation after an SCI transmission and before the transmitter's PSSCH transmission may allow the transmitter to detect a resource collision in an SCI-to-PSSCH scheduling time gap.

Figure 9:
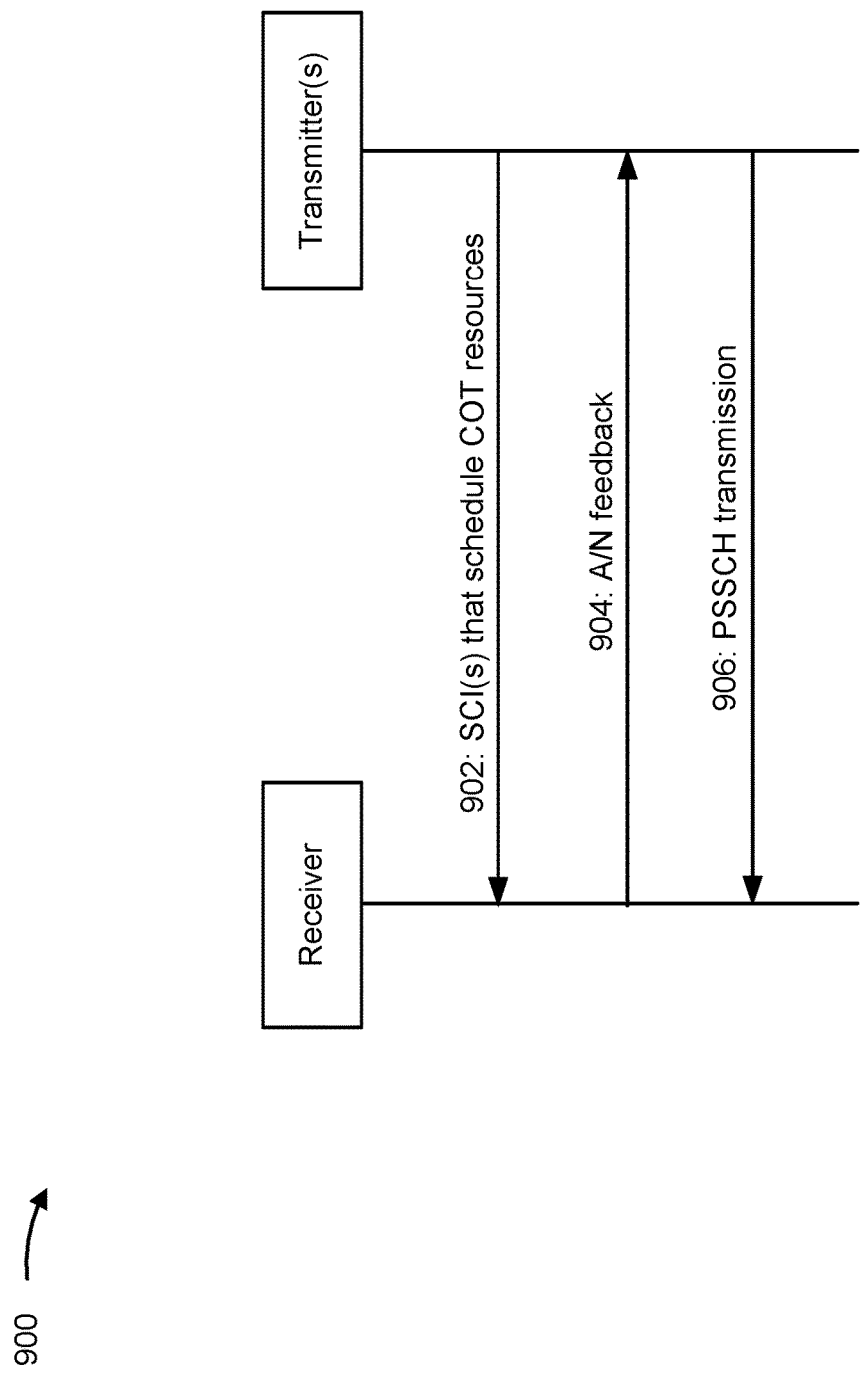
FIG. 9 is a diagram illustrating an example associated with sidelink transmissions using receiver feedback, in accordance with the present disclosure.

FIG. 9 is a diagram illustrating an example 900 associated with sidelink transmissions using receiver feedback, in accordance with the present disclosure. As shown in FIG. 9, example 900 includes communication between a receiver (e.g., UE 120a) and transmitter(s) (e.g., UE 120e). In some aspects, the receiver and the transmitter(s) may be included in a wireless network, such as wireless network 100.

As shown by reference number 902, the receiver may receive, from two or more transmitters, two or more SCIs that schedule COT resources for the two or more transmitters. The two or more SCIs may be associated with a same mini-slot or slot. In some aspects, the two or more SCIs associated with the same mini-slot may be associated with same or different control subchannel. Two or more SCIs associated with a same control subchannel may be associated with different orthogonal cover codes.

As shown by reference number 904, the receiver may transmit, to a transmitter of the two or more transmitters and based at least in part on the two or more SCIs, an A/N feedback via a time division multiplexed or a frequency division multiplexed mini-slot carrying a PSFCH or SLFI with SCI. The A/N feedback may be transmitted before an LBT and PSSCH transmission from the transmitter.

In some aspects, the receiver may transmit an ACK based at least in part on the two or more SCIs not being associated with a same COT resource. The LBT and the PSSCH transmission may be associated with an originally scheduled COT resource based at least in part on the ACK. The same COT resource may indicate a same frequency resource in a same slot for a frequency division multiplexed receiver and a same starting position in the same slot for a time division multiplexed receiver. In some aspects, the receiver may transmit the ACK based at least in part on a projected RSRP of a jamming transmitter of the two or more transmitters satisfying a threshold, where the jamming transmitter may transmit an SCI which schedules an overlapping COT resource as a target transmitter of the two or more transmitters. In some aspects, the receiver may transmit a NACK based at least in part on the two or more SCIs being associated with a same COT resource that causes a COT resource allocation collision, where the LBT and the PSSCH transmission may be associated with a rescheduled COT resource based at least in part on the NACK.

In some aspects, the receiver may sense the two or more SCIs during a receiver sensing window. The receiver may determine the COT resource allocation collision based at least in part on the two or more SCIs sensed during the receiver sensing window. The receiver sensing window may be configured based at least in part on SCIs in different mini-slots being able to schedule a same data resource, and/or the SCIs being able to schedule more than one slot for COT resources or a multi-transmission time interval (TTI) grant. In some aspects, the two or more SCIs may include a target SCI. The receiver sensing window may end at a mini-slot of the target SCI. A size of the receiver sensing window may be based at least in part on an offset value (K1) and a maximum quantity of COT resources. The size of the receiver sensing window may be based at least in part on a maximum offset value (K1) configured in a network, an offset value (K1) indicated in the target SCI, and a maximum quantity of COT slots or mini-slots permitted per SCI scheduling in the network.

In some aspects, the receiver may transmit the NACK based at least in part on an SCI-2 associated with a detected SCI-1 not being decoded. The SCI-2 may indicate a single TTI grant or a multi-TTI grant over the COT resources. The SCI-2 may indicate scheduling parameters, and the SCI-1 may indicate a source identifier and a destination identifier. In some aspects, the receiver may transmit the NACK based at least in part on a colliding starting position detected in a receiver sensing window among the two or more SCIs associated with overlapping time and frequency resources. The receiver may transmit a list of conflicting starting positions or last conflicting starting positions for one or more priority classes with the NACK in the SLFI with SCI.

In some aspects, the receiver may transmit, in the SLFI with SCI, a NACK and an indication of a conflict associated with a TDRA or an FDRA. In some aspects, the receiver may transmit, in the SLFI with SCI, a NACK, an indication of occupied time and frequency resources from a receiver sensing during a receiving sensing window, and a corresponding RSRP. The transmitter may perform a data resource reselection based at least in part on the NACK, the indication of occupied time and frequency resources, and the corresponding RSRP, and where the PSSCH transmission may be a rescheduled PSSCH transmission.

As shown by reference number 906, the receiver may receive, from the transmitter using a COT resource, the PSSCH transmission based at least in part on the A/N feedback. The transmitter may adjust the LBT and the PSSCH transmission based at least in part on the A/N feedback. In some aspects, a resource index and an offset value of the SLFI with SCI may be indicated in a data scheduling SCI, and the transmitter may adjust the PSSCH transmission based at least in part on the resource index and the offset value of the SLFI with SCI.

In some aspects, the transmitter may determine, before transmitting the SCI in an anchor carrier, whether the COT resources are occupied by another transmitter, and whether starting positions are occupied after a transmitter sensing window. The transmitter may transmit the SCI based at least in part on a modification to a FDRA or to a starting position, or the transmitters may transmit the SCI with a non-conflicting FDRA or TDRA. In some aspects, the transmitter may determine, based at least in part on a sensing performed during the transmitter sensing window, that the COT resource is associated with a collision and that a corresponding RSRP satisfies a threshold. The transmitter may retransmit the SCI in a previously reserved mini-slot resource with a different FDRA or TDRA or starting position.

As indicated above, FIG. 9 is provided as an example. Other examples may differ from what is described with regard to FIG. 9.

Figure 10:
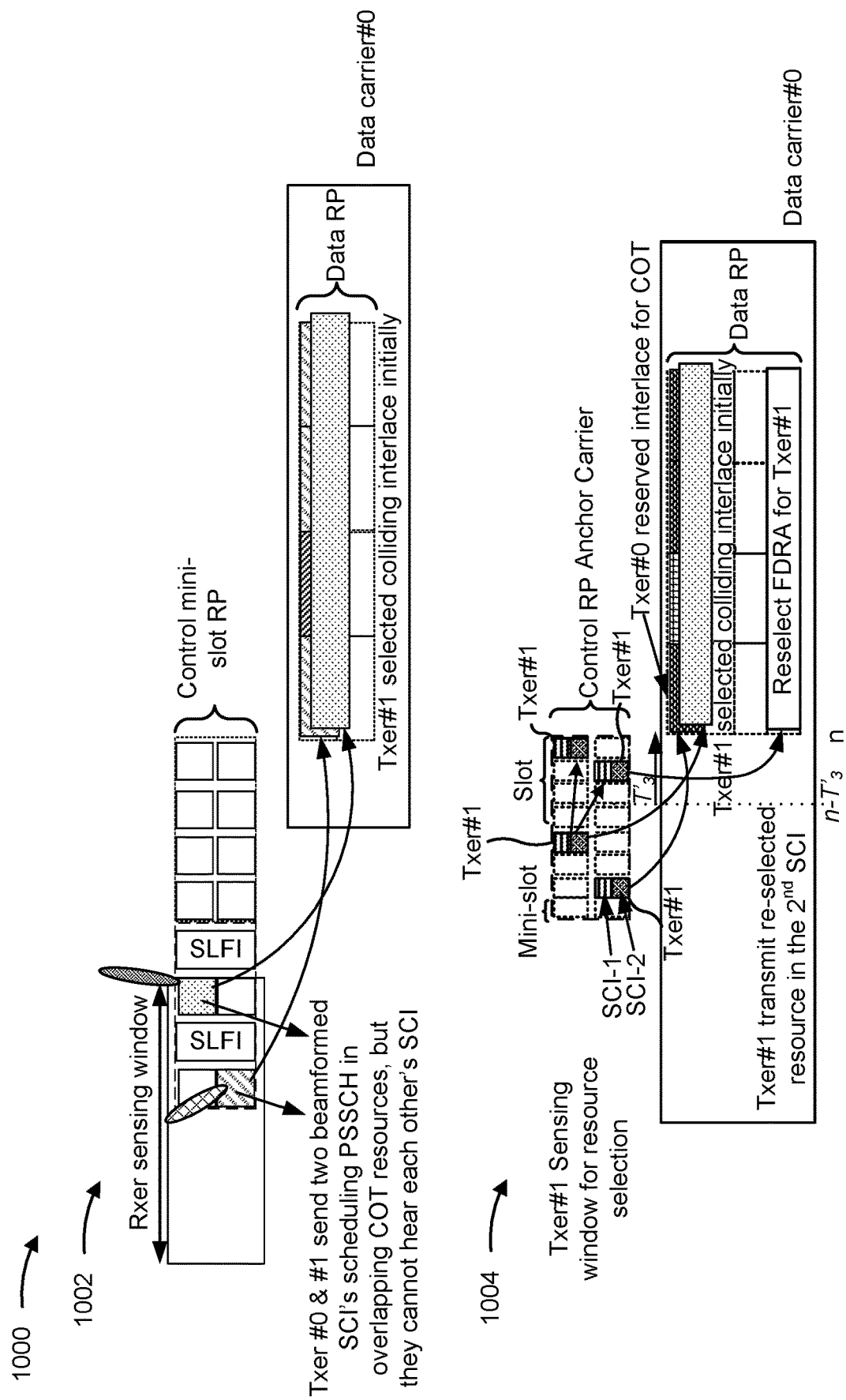
FIG. 10 is a diagram illustrating an example associated with a receiver assisted resource scheduling or reservation, in accordance with the present disclosure.

FIG. 10 is a diagram illustrating an example 1000 associated with a receiver assisted resource scheduling or reservation, in accordance with the present disclosure.

As shown by reference number 1002, a first transmitter (Txer #0) and a second transmitter (Txer #1) may transmit two beamformed SCIs for scheduling PSSCHs in overlapping COT resources. However, the first transmitter and the second transmitter may be unable to detect each other's SCI. The second transmitter may initially select a colliding interlace. In other words, the cooling interlace may collide with the first transmitter's reserved interlace for COT.

As shown by reference number 1004, the second transmitter may receive, from a receiver via a PSFCH or SLFI, receiver sensing results on a colliding FDRA or TDRA or starting position, which may assist the second transmitter's resource selection or PSSCH starting position adjustment. The receiver may transmit the receiver sensing results via the PSFCH or SLFI after detecting a collision of scheduled COT resources between the first transmitter and the second transmitter. The second transmitter may transmit a reselected resource in a second SCI, based at least in part on the receiving sensing results indicated by the receiver.

As indicated above, FIG. 10 is provided as an example. Other examples may differ from what is described with regard to FIG. 10.

In some aspects, in sub-6 GHz, when scheduling SCIs are transmitted in different mini-slots, transmitters may rely on sensing and a last-minute evaluation to detect a data resource collision. Transmitter sensing may not work when two SCIs scheduling conflict data resources are in a same mini-slot due to half-duplex deafness but may be resolved using receiver sensing.

Figure 11:
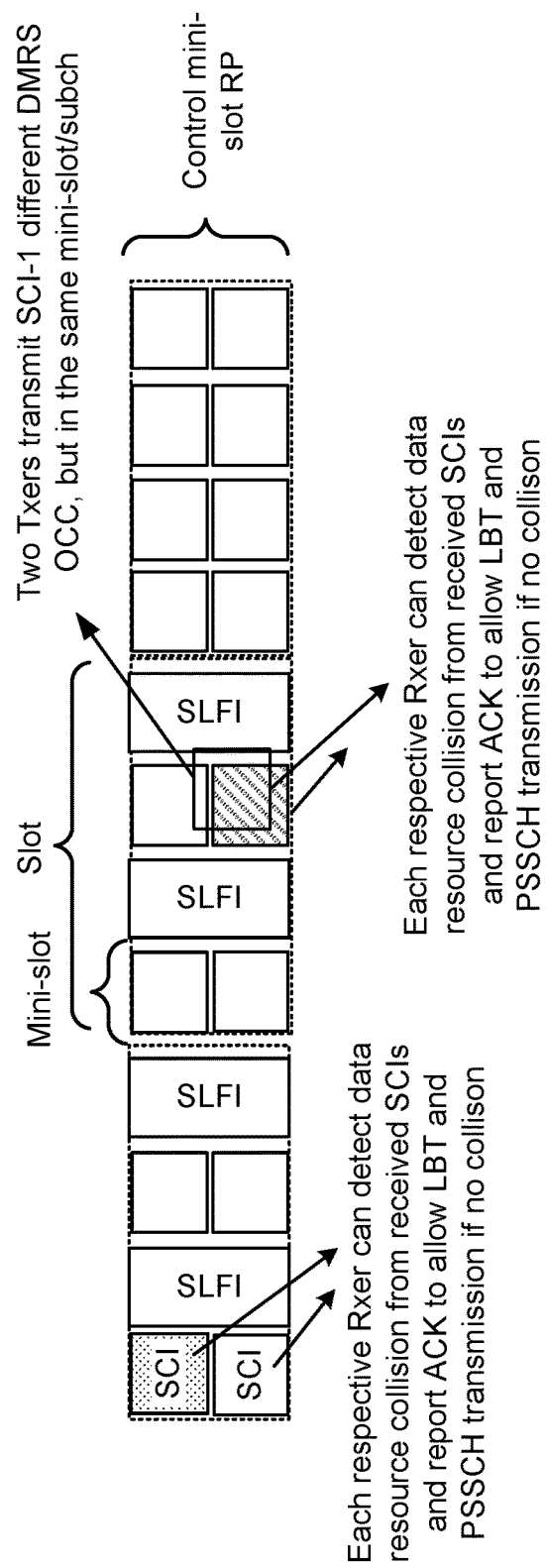
FIG. 11 is a diagram illustrating an example associated with an SCI acknowledgement or negative acknowledgement (A/N), in accordance with the present disclosure.

FIG. 11 is a diagram illustrating an example 1100 associated with an SCI A/N, in accordance with the present disclosure.

As shown in FIG. 11, two transmitters may transmit SCIs in a same mini-slot. Each respective receiver may detect a data resource collision from received SCIs and may report an ACK to allow an LBT and PSSCH transmission if no collision is detected. The A/N based on the received SCIs may occur before the LBT and the PSSCH transmission. In some cases, the two transmitters may transmit SCIs in a same mini-slot or subchannel but using different DMRS OCCs, and the receiver may report the ACK to allow the LBT and PSSCH transmission if no collision is detected.

As indicated above, FIG. 11 is provided as an example. Other examples may differ from what is described with regard to FIG. 11.

In some aspects, a receiver may report, to a transmitter, an A/N via time division multiplexing (TDM) or frequency division multiplexing (FDM) in a mini-slot PSFCH or SLFI carrying SCI to acknowledge an SCI scheduling in a same control mini-slot for sub-6 GHz. The receiver may report, to the transmitter, an ACK when no two decodable SCI-1s in the same mini-slot point to a same COT resource. Same COT resources may refer to a same frequency resource in a same slot for an FDM UE and a same starting position in a same slot for a TDM UE. The receiver may report, to the transmitter, an ACK when a projected RSRP from a jamming transmitter satisfies a preconfigured threshold (e.g., the projected RSRP is less than the preconfigured threshold). The jamming transmitter may transmit an SCI-1 that schedules an overlapping COT as a target transmitter.

In some aspects, when the transmitter receives the ACK from the receiver, the transmitter may start an LBT and perform a PSSCH transmission on a scheduled COT resource but may still be subjected to a last-minute evaluation before the PSSCH transmission.

In some aspects, two SCIs in the same mini-slot may be in same or different control subchannels. When the two SCIs are in the same control subchannel, two respective transmitters may select different OCCs, and SCI-1s from different transmitters with comparable receive powers may all be decoded. The receiver may determine whether scheduled COT resources associated with the SCI-1s collide or not collide. When a COT resource allocation collision is detected, the receiver may transmit a NACK to respective transmitters indicated in the SCI-1.

In some aspects, for an SLFI carrying SCI, a resource index and K1 value of the SLFI may be indicated in a data scheduling SCI-2, which may allowing skipping a PSSCH transmission or reception when potential PSSCH jamming is detected via receiver SCI sensing, as well as allowing the transmitter to reschedule a retransmission to occur at an earlier time. In some aspects, other nodes may not detect an ACK that confirms a PSSCH resource reservation, and a reserved COT resource may not be used by a target transmitter for a PSSCH transmission.

In a mmW system, transmitter sensing may not be as effective as in a sub-6 GHz system, as two transmitters transmitting two beamformed SCIs even in different mini-slots may not hear each other's SCI. Receiver SCI sensing over a period of time and PSSCH transmission control may be helpful in preventing a transmitter from transmitting a PSSCH in jamming resources.

In some aspects, the receiver may sense SCIs over a receiver sensing window to determine a presence of other transmitter scheduling on conflicting COT or data resources indicated by a target SCI associated with a transmitter. The receiver sensing window may be defined to accommodate that SCI in different mini-slots may schedule in a same data resource as the target SCI (e.g., relatively wide range of K0 value). The receiver sensing window may be defined to accommodate that the SCI may schedule more than one slot for COT resources or a multi-TTI, where SCI in a prior mini-slot may allocate slots overlapping with the target SCI (e.g., a current target SCI).

In some aspects, with respect to the receiver sensing window for the mmW system, a receiver sensing window size may depend on possible values of K0 and a maximum quantity of COT resources. The receiver sensing window may end at a mini-slot of a target SCI. The receiver sensing window size may be equal to $K_{0,max} - K_{0,target} N_{COT\ slots,\ max}$, where $K_{0,max}$ may be a maximum K0 configured in a network, $K_{0,target}$ may be the K0 indicated in the target SCI (e.g., $K_{0,target} = 0$ so that the receiver sensing window size does not depend on SCI), and $N_{COT\ slots,\ max}$ may be a maximum quantity of COT slots/mini-slots allowed per SCI scheduling in the network. In some cases, the receiver sensing window may be a single mini-slot.

In some aspects, when no data resource conflict is detected or the projected RSRP satisfies the threshold (e.g., the projected RSRP is less than the threshold) in the receiver sensing window, the receiver may report an ACK to the transmitter (e.g., the target transmitter) in the associated PSFCH or SLFI carrying SCI. Otherwise, the receiver may report a NACK to the transmitter. The transmitter may proceed with an LBT and PSSCH transmission when the ACK is received from the receiver, but may be subjected to the last-minute evaluation before the PSSCH transmission.

In some aspects, the receiver may report the NACK via TDM/FDM in a mini-slot PSFCH or SLFI carrying SCI, in order to gate (or control) the LBT and PSSCH transmission when an SCI-2 associated with a detected SCI-1 is undecodable and the SCI-2 is associated with a control resource pool. The receiver may cause PSSCH transmission gating with the undecodable SCI-2. The SCI-2 may carry a single/multi-TTI grant over COT resources. The SCI-2 may indicate scheduling parameters, such as an NDI, a HARQ ID, and/or a redundancy version (RV). The undecodable SCI-2 may cause the PSSCH transmission to be useless. The SCI-1 may indicate source and destination identifiers, so a target receiver may report an SCI-2 undecodable event and allow the transmitter to gate the LBT and PSSCH transmission. In some aspects, the receiver may transmit the SLFI carrying SCI (e.g., SLFI SCI) to the transmitter, which may carry multiple bits. The multiple bits may be used to carry useful receiver sensing results, which may allow the transmitter to gate the LBT and PSSCH transmission.

In some aspects, for a time division multiplexed transmitter, when a colliding starting position is detected in the receiver sensing window among SCIs pointing to time/frequency resources (or T/F rectangles) overlapping with scheduled time/frequency resources, the receiver may report a list of conflicting starting positions or last conflicting starting positions of each priority class along with the NACK in the SLFI. The receiver may report the list along with the NACK to the transmitter. Over the time/frequency resources scheduled by the target SCI, if the receiver finds another SCI in the receiver sensing window that schedules overlapping time/frequency resources with a same starting position, the receiver may report the NACK along with a list of staring positions indicated in SCIs which also schedule overlapping time/frequency resources. The transmitter, after receiving the NACK, may randomly select a different starting position other than a starting position on the list or after the last conflicting starting position, and the transmitter may adjust the starting position of the PSSCH transmission by a cyclic prefix (CP) extension.

In some aspects, when the receiver detects a conflict TDRA/FDRA in the receiving sensing window with respect to the target SCI, a transmitter timeline may not allow FDRA/TDRA change over an upcoming PSSCH transmission. However, the receiver may provide an indication of conflicting time/frequency resources to assist the transmitter in selecting data resources for a data resource reselection.

In some aspects, the receiver may indicate, to the transmitter, a NACK and TDRA/FDRA conflict in an SLFI, which may cause the transmitter to gate the PSSCH transmission. When the FDRA/TDRA conflict is detected in the receiver sensing window, the receiver may indicate the NACK and use a codepoint to indicate the TDRA/FDRA conflict in the SLFI. The transmitter, after receiving the indication from the receiver, may gate the scheduled PSSCH transmission to avoid interference.

In some aspects, the receiver may indicate, to the transmitter, occupied time/frequency resources from the receiver sensing results and corresponding RSRP values. The receiver may transmit the indication in the SLFI to assist the transmitter with the data resource reselection. From the receiver sensing results, the receiver may determine the occupied time/frequency resources after the target SCI and the corresponding RSRP values. The receiver may convey, to the transmitter, the TDRA/FDRA of the occupied time/frequency resources and the corresponding RSRP values in the SLFI, which may assist the transmitter in performing the data resource reselection and rescheduling the PSSCH transmission in a second SCI.

Figure 12:
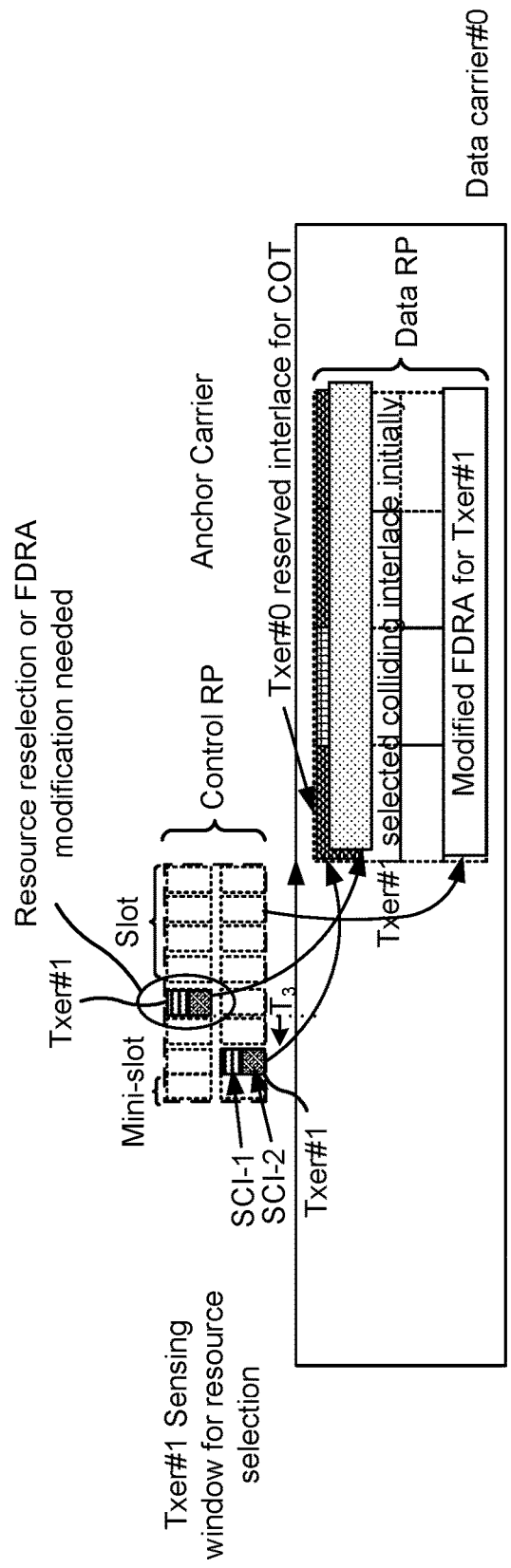
FIGS. 12-13 are diagrams illustrating examples associated with last-minute evaluations on reserved channel occupancy time (COT) resources, in accordance with the present disclosure.

FIG. 12 is a diagram illustrating an example 1200 associated with a last-minute evaluation on reserved COT resources, in accordance with the present disclosure.

As shown in FIG. 12, a first transmitter (Txer #0) may reserve an interlace for a COT. A second transmitter (Txer #1) may initially select a colliding interface, with respect to the interlace reserved by the first transmitter. The second transmitter may sense a collision associated with the first transmitter in a last-minute evaluation on reserved COT resources. The second transmitter may determine that a resource reselection or an FDRA modification is needed based at least in part on the sensed collision. The second transmitter may use a modified FDRA for a COT. Since K0 is greater than zero (e.g., from a scheduling SCI to a PSSCH transmission), after the second transmitter performs the last-minute evaluation during a transmitter sensing window, the second transmitter may have sufficient time to modify the scheduling SCI's TDRA or FDRA or starting position and the PSSCH transmission accordingly.

As indicated above, FIG. 12 is provided as an example. Other examples may differ from what is described with regard to FIG. 12.

In some aspects, a frequency division multiplexed transmitter may perform a last-minute evaluation on reserved COT resources, before an SCI transmission in an anchor channel, to check if a certain time/frequency resource is occupied by another transmitter after the frequency division multiplexed transmitter performed the resource selection. A time division multiplexed transmitter may also check if some starting positions are occupied after a transmitter sensing window. A transmitter associated with FDM or TDM may perform the last-minute evaluation at a time (e.g., $T_3$) before transmitting a scheduling SCI. When a conflicting resource is detected and a processing time permits, the transmitter may modify an FDRA or starting position in an SCI-1. When the conflicting resource is detected and the processing time is not sufficient, the transmitter may perform a resource reselection in a control resource pool to transmit a scheduling SCI-1 with a non-conflicting FDRA or TDRA, or with a starting position in a later control resource.

In some aspects, for a non-zero scheduling delay (K0) between the scheduling SCI and a PSSCH transmission, after the scheduling SCI is transmitted, the transmitter may continue to detect a colliding FDRA or a starting position allocation for a COT reservation from other transmitters before the PSSCH transmission. In this case, the transmitter may perform the last-minute evaluation right before the PSSCH transmission.

Figure 13:
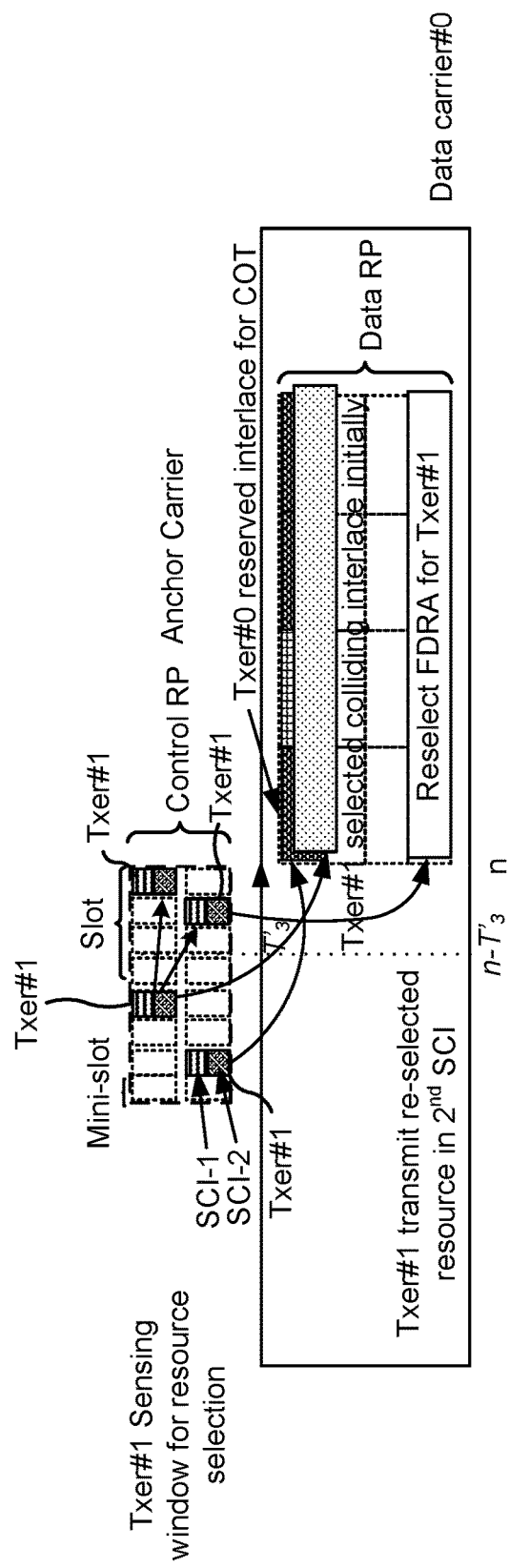

FIG. 13 is a diagram illustrating an example 1300 associated with a last-minute evaluation on reserved COT resources, in accordance with the present disclosure.

As shown in FIG. 13, a first transmitter (Txer #0) may reserve an interlace for a COT. A second transmitter (Txer #1) may initially select a colliding interface, with respect to the interlace reserved by the first transmitter. The second transmitter may sense a collision associated with the first transmitter in a last-minute evaluation on reserved COT resources. The second transmitter may sense the collision during a transmitter sensing window for resource reselection. The second transmitter may continue to detect a colliding FDRA for a COT reservation from other transmitters (e.g., the first transmitter) before an actual PSSCH transmission. The second transmitter may transmit a reselected resource in a second SCI. The second transmitter may reselect an FDRA based at least in part on the sensed collision.

As indicated above, FIG. 13 is provided as an example. Other examples may differ from what is described with regard to FIG. 13.

In some aspects, a transmitter (e.g., a sidelink transmitter) may perform a last-minute evaluation before a time/frequency resource reserved for a COT to gate or modify a PSSCH transmission. The last-minute evaluation may be performed before the PSSCH transmission. At time $n-T_3'$, which after a scheduling SCI is transmitted, the transmitter may perform the last-minute evaluation based at least in part on sensing results of the transmitter. The sensing results may be from a transmitter sensing window. When a colliding resource is scheduled after the transmitter sensing window and a projected RSRP satisfies a threshold (e.g., the projected RSRP is greater than a preconfigured threshold) for a frequency division multiplexed transmitter, or a starting position collision is detected by a time division multiplexed transmitter, then the transmitter may not use previously scheduled resources for the COT and the PSSCH transmission. Instead, the transmitter may retransmit an SCI in a previously reserved mini-slot resource in a control resource pool and the SCI may select a different FDRA (or interlace) or TDRA (K0 and COT duration) or starting position (for a time division multiplexed transmitter). A second SCI may not need to be transmitted for a starting position resource collision only for time division multiplexed transmitters.

In some aspects, for a full band TDM transmitter, the transmitter may modify a starting position of the PSSCH transmission when a starting position collision is detected in the last-minute evaluation before the PSSCH transmission. The starting position of the PSSCH transmission may be modified based at least in part on a CP extension, which may involve copying samples in a time domain buffer.

Figure 14:
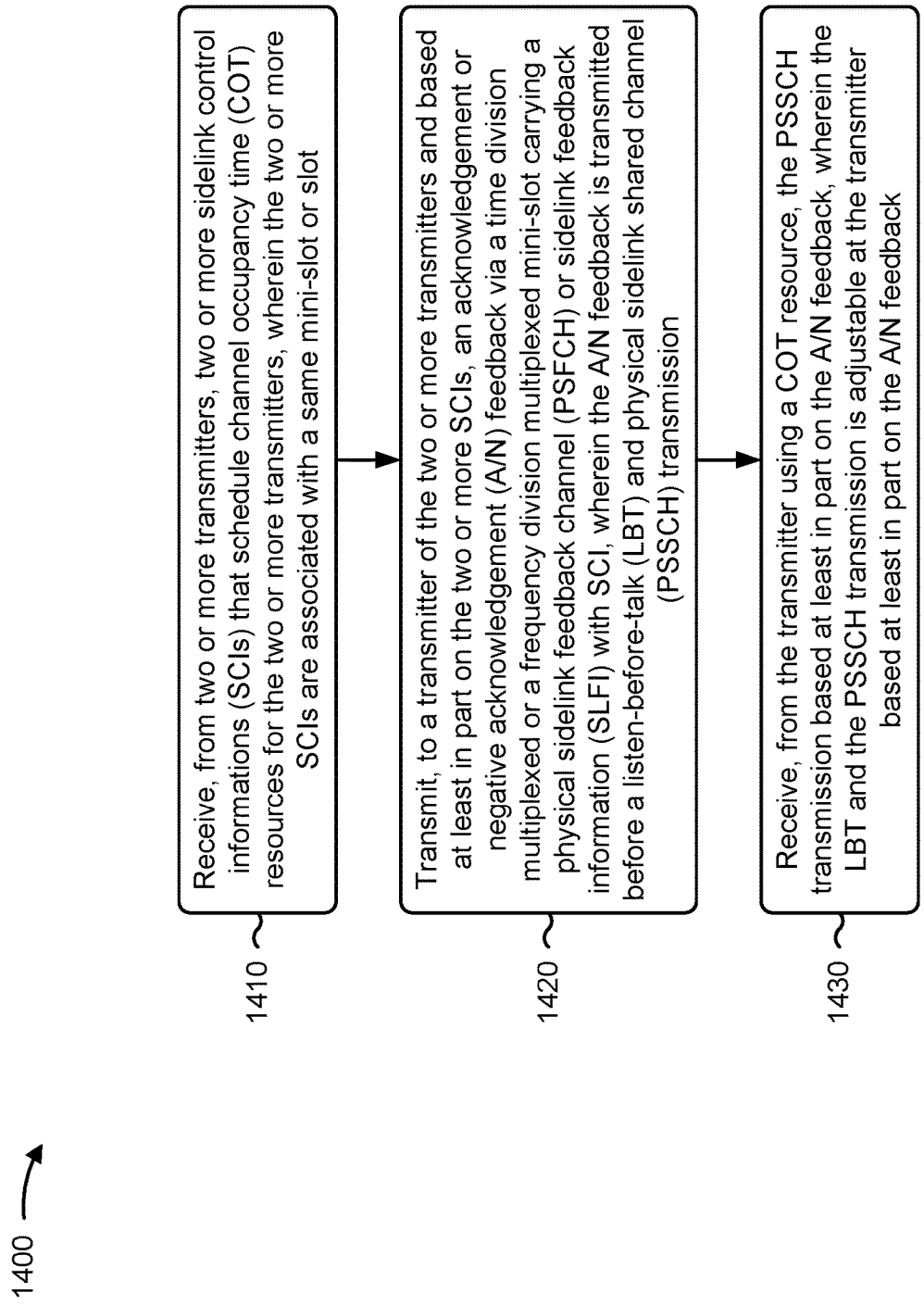
FIGS. 14-15 are diagrams illustrating example processes associated with sidelink transmissions using receiver feedback, in accordance with the present disclosure.

FIG. 14 is a diagram illustrating an example process 1400 performed, for example, by a receiver, in accordance with the present disclosure. Example process 1400 is an example where the receiver (e.g., UE 120a) performs operations associated with sidelink transmissions using receiver feedback.

As shown in FIG. 14, in some aspects, process 1400 may include receiving, from two or more transmitters, two or more SCIs that schedule COT resources for the two or more transmitters, wherein the two or more SCIs are associated with a same mini-slot or slot (block 1410). For example, the receiver (e.g., using communication manager 140 and/or reception component 1602, depicted in FIG. 16) may receive, from two or more transmitters, two or more SCIs that schedule COT resources for the two or more transmitters, wherein the two or more SCIs are associated with a same mini-slot or slot, as described above.

As further shown in FIG. 14, in some aspects, process 1400 may include transmitting, to a transmitter of the two or more transmitters and based at least in part on the two or more SCIs, an A/N feedback via a time division multiplexed or a frequency division multiplexed mini-slot carrying a PSFCH or SLFI with SCI, wherein the A/N feedback is transmitted before an LBT and PSSCH transmission (block 1420). For example, the receiver (e.g., using communication manager 140 and/or transmission component 1604, depicted in FIG. 16) may transmit, to a transmitter of the two or more transmitters and based at least in part on the two or more SCIs, an A/N feedback via a time division multiplexed or a frequency division multiplexed mini-slot carrying a PSFCH or SLFI with SCI, wherein the A/N feedback is transmitted before an LBT and PSSCH transmission, as described above.

As further shown in FIG. 14, in some aspects, process 1400 may include receiving, from the transmitter using a COT resource, the PSSCH transmission based at least in part on the A/N feedback, wherein the LBT and the PSSCH transmission are adjustable at the transmitter based at least in part on the A/N feedback (block 1430). For example, the receiver (e.g., using communication manager 140 and/or reception component 1602, depicted in FIG. 16) may receive, from the transmitter using a COT resource, the PSSCH transmission based at least in part on the A/N feedback, wherein the LBT and the PSSCH transmission are adjustable at the transmitter based at least in part on the A/N feedback, as described above.

Process 1400 may include additional aspects, such as any single aspect or any combination of aspects described below and/or in connection with one or more other processes described elsewhere herein.

In a first aspect, process 1400 includes comprises transmitting an ACK based at least in part on the two or more SCIs not being associated with a same COT resource, wherein the LBT and the PSSCH transmission are associated with an originally scheduled COT resource based at least in part on the ACK.

In a second aspect, alone or in combination with the first aspect, process 1400 includes transmitting an ACK based at least in part on a projected RSRP of a jamming transmitter of the two or more transmitters satisfying a threshold, wherein the jamming transmitter transmits an SCI which schedules an overlapping COT resource as a target transmitter of the two or more transmitters.

In a third aspect, alone or in combination with one or more of the first and second aspects, the two or more SCIs associated with the same mini-slot are associated with a same control subchannel and associated with different OCCs.

In a fourth aspect, alone or in combination with one or more of the first through third aspects, process 1400 includes transmitting a NACK based at least in part on the two or more SCIs being associated with a same COT resource that causes a COT resource allocation collision, wherein the LBT and the PSSCH transmission are associated with a rescheduled COT resource based at least in part on the NACK.

In a fifth aspect, alone or in combination with one or more of the first through fourth aspects, a resource index and an offset value of the SLFI with SCI is indicated in a data scheduling SCI, and the PSSCH transmission is adjustable based at least in part on the resource index and the offset value of the SLFI with SCI.

In a sixth aspect, alone or in combination with one or more of the first through fifth aspects, process 1400 includes sensing the two or more SCIs during a receiver sensing window, and determining a COT resource allocation collision based at least in part on the two or more SCIs sensed during the receiver sensing window.

In a seventh aspect, alone or in combination with one or more of the first through sixth aspects, the receiver sensing window is configured based at least in part on SCIs in different mini-slots being able to schedule a same data resource, and the SCIs being able to schedule more than one slot for COT resources or a multi-transmission time interval grant.

In an eighth aspect, alone or in combination with one or more of the first through seventh aspects, the two or more SCIs include a target SCI, wherein the receiver sensing window ends at a mini-slot of the target SCI, wherein a size of the receiver sensing window is based at least in part on an offset value and a maximum quantity of COT resources, and the size of the receiver sensing window is based at least in part on a maximum offset value configured in a network, an offset value indicated in the target SCI, and a maximum quantity of COT slots or mini-slots permitted per SCI scheduling in the network.

In a ninth aspect, alone or in combination with one or more of the first through eighth aspects, process 1400 includes transmitting a NACK based at least in part on an SCI-2 associated with a detected SCI-1 not being decoded, wherein the SCI-2 indicates a single TTI grant or a multi-TTI grant over the COT resources, wherein the SCI-2 indicates scheduling parameters, and the SCI-1 indicates a source identifier and a destination identifier.

In a tenth aspect, alone or in combination with one or more of the first through ninth aspects, process 1400 includes transmitting a NACK based at least in part on a colliding starting position detected in a receiver sensing window among the two or more SCIs associated with overlapping time and frequency resources, wherein a list of conflicting starting positions or last conflicting starting positions for one or more priority classes is transmitted with the NACK in the SLFI with SCI.

In an eleventh aspect, alone or in combination with one or more of the first through tenth aspects, process 1400 includes transmitting, in the SLFI with SCI, a NACK and an indication of a conflict associated with a TDRA or an FDRA.

In a twelfth aspect, alone or in combination with one or more of the first through eleventh aspects, process 1400 includes transmitting, in the SLFI with SCI, a NACK, an indication of occupied time and frequency resources from a receiver sensing during a receiving sensing window, and a corresponding RSRP, wherein a data resource reselection at the transmitter is based at least in part on the NACK, the indication of occupied time and frequency resources, and the corresponding RSRP, and the PSSCH transmission is a rescheduled PSSCH transmission.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
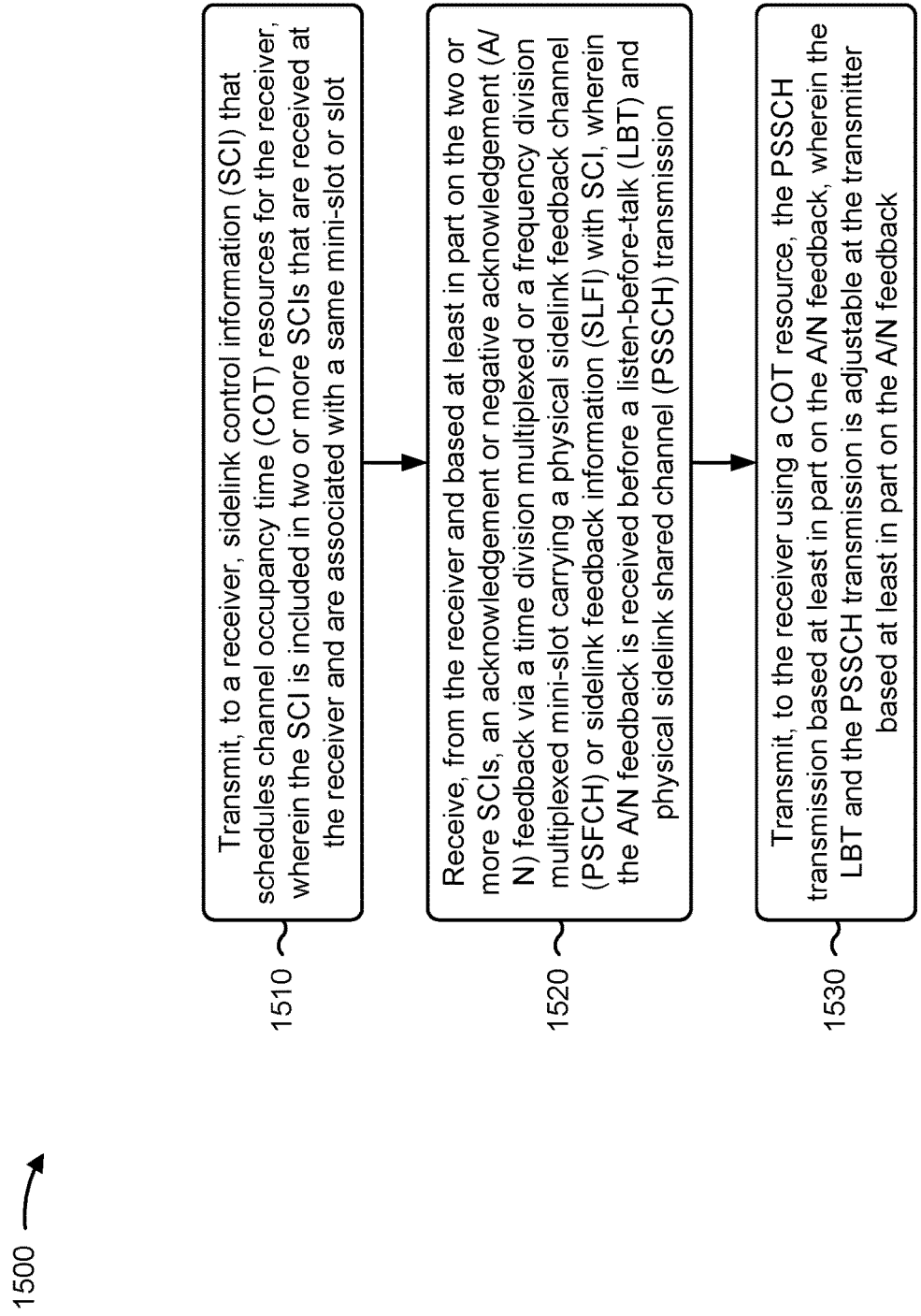

FIG. 15 is a diagram illustrating an example process 1500 performed, for example, by a transmitter, in accordance with the present disclosure. Example process 1500 is an example where the transmitter (e.g., UE 120e) performs operations associated with sidelink transmissions using receiver feedback.

As shown in FIG. 15, in some aspects, process 1500 may include transmitting, to a receiver, SCI that schedules COT resources for the receiver, wherein the SCI is included in two or more SCIs that are received at the receiver and are associated with a same mini-slot or slot (block 1510). For example, the transmitter (e.g., using communication manager 150 and/or transmission component 1704, depicted in FIG. 17) may transmit, to a receiver, SCI that schedules COT resources for the receiver, wherein the SCI is included in two or more SCIs that are received at the receiver and are associated with a same mini-slot or slot, as described above.

As further shown in FIG. 15, in some aspects, process 1500 may include receiving, from the receiver and based at least in part on the two or more SCIs, an A/N feedback via a time division multiplexed or a frequency division multiplexed mini-slot carrying a PSFCH or SLFI with SCI, wherein the A/N feedback is received before an LBT and PSSCH transmission (block 1520). For example, the transmitter (e.g., using communication manager 150 and/or reception component 1702, depicted in FIG. 17) may receive, from the receiver and based at least in part on the two or more SCIs, an A/N feedback via a time division multiplexed or a frequency division multiplexed mini-slot carrying a PSFCH or SLFI with SCI, wherein the A/N feedback is received before an LBT and PSSCH transmission, as described above.

As further shown in FIG. 15, in some aspects, process 1500 may include transmitting, to the receiver using a COT resource, the PSSCH transmission based at least in part on the A/N feedback, wherein the LBT and the PSSCH transmission are adjustable at the transmitter based at least in part on the A/N feedback (block 1530). For example, the transmitter (e.g., using communication manager 150 and/or transmission component 1704, depicted in FIG. 17) may transmit, to the receiver using a COT resource, the PSSCH transmission based at least in part on the A/N feedback, wherein the LBT and the PSSCH transmission are adjustable at the transmitter based at least in part on the A/N feedback, as described above.

Process 1500 may include additional aspects, such as any single aspect or any combination of aspects described below and/or in connection with one or more other processes described elsewhere herein.

In a first aspect, process 1500 includes receiving an ACK based at least in part on the two or more SCIs not being associated with a same COT resource, wherein the LBT and the PSSCH transmission are associated with an originally scheduled COT resource based at least in part on the ACK.

In a second aspect, alone or in combination with the first aspect, the two or more SCIs associated with the same mini-slot are associated with a same control subchannel and associated with different OCCs.

In a third aspect, alone or in combination with one or more of the first and second aspects, process 1500 includes receiving a NACK based at least in part on the two or more SCIs being associated with a same COT resource that causes a COT resource allocation collision, wherein the LBT and the PSSCH transmission are associated with a rescheduled COT resource based at least in part on the NACK.

In a fourth aspect, alone or in combination with one or more of the first through third aspects, a resource index and an offset value of the SLFI with SCI is indicated in a data scheduling SCI, and process 1500 includes adjusting the PSSCH transmission based at least in part on the resource index and the offset value of the SLFI with SCI.

In a fifth aspect, alone or in combination with one or more of the first through fourth aspects, process 1500 includes receiving a NACK based at least in part on an SCI-2 associated with a detected SCI-1 not being decoded, wherein the SCI-2 indicates a single TTI grant or a multi-TTI grant over the COT resources, wherein the SCI-2 indicates scheduling parameters, and the SCI-1 indicates a source identifier and a destination identifier.

In a sixth aspect, alone or in combination with one or more of the first through fifth aspects, process 1500 includes receiving a NACK based at least in part on a colliding starting position detected in a receiver sensing window among the two or more SCIs associated with overlapping time and frequency resources, wherein a list of conflicting starting positions or last conflicting starting positions for one or more priority classes is received with the NACK in the SLFI with SCI.

In a seventh aspect, alone or in combination with one or more of the first through sixth aspects, process 1500 includes receiving, in the SLFI with SCI, a NACK and an indication of a conflict associated with a TDRA or an FDRA.

In an eighth aspect, alone or in combination with one or more of the first through seventh aspects, process 1500 includes performing a data resource reselection based at least in part on the NACK, the indication of occupied time and frequency resources, and the corresponding RSRP, and the PSSCH transmission is a rescheduled PSSCH transmission.

In a ninth aspect, alone or in combination with one or more of the first through eighth aspects, process 1500 includes determining, before transmitting the SCI in an anchor carrier, whether the COT resources are occupied by another transmitter, and whether starting positions are occupied after a transmitter sensing window, and process 1500 includes transmitting the SCI based at least in part on a modification to an FDRA or to a starting position, or transmitting the SCI with a non-conflicting FDRA or TDRA.

In a tenth aspect, alone or in combination with one or more of the first through ninth aspects, process 1500 includes determining, based at least in part on a sensing performed during a transmitter sensing window, that the COT resource is associated with a collision and that a corresponding RSRP satisfies a threshold, and retransmitting the SCI in a previously reserved mini-slot resource with a different FDRA or TDRA or starting position.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
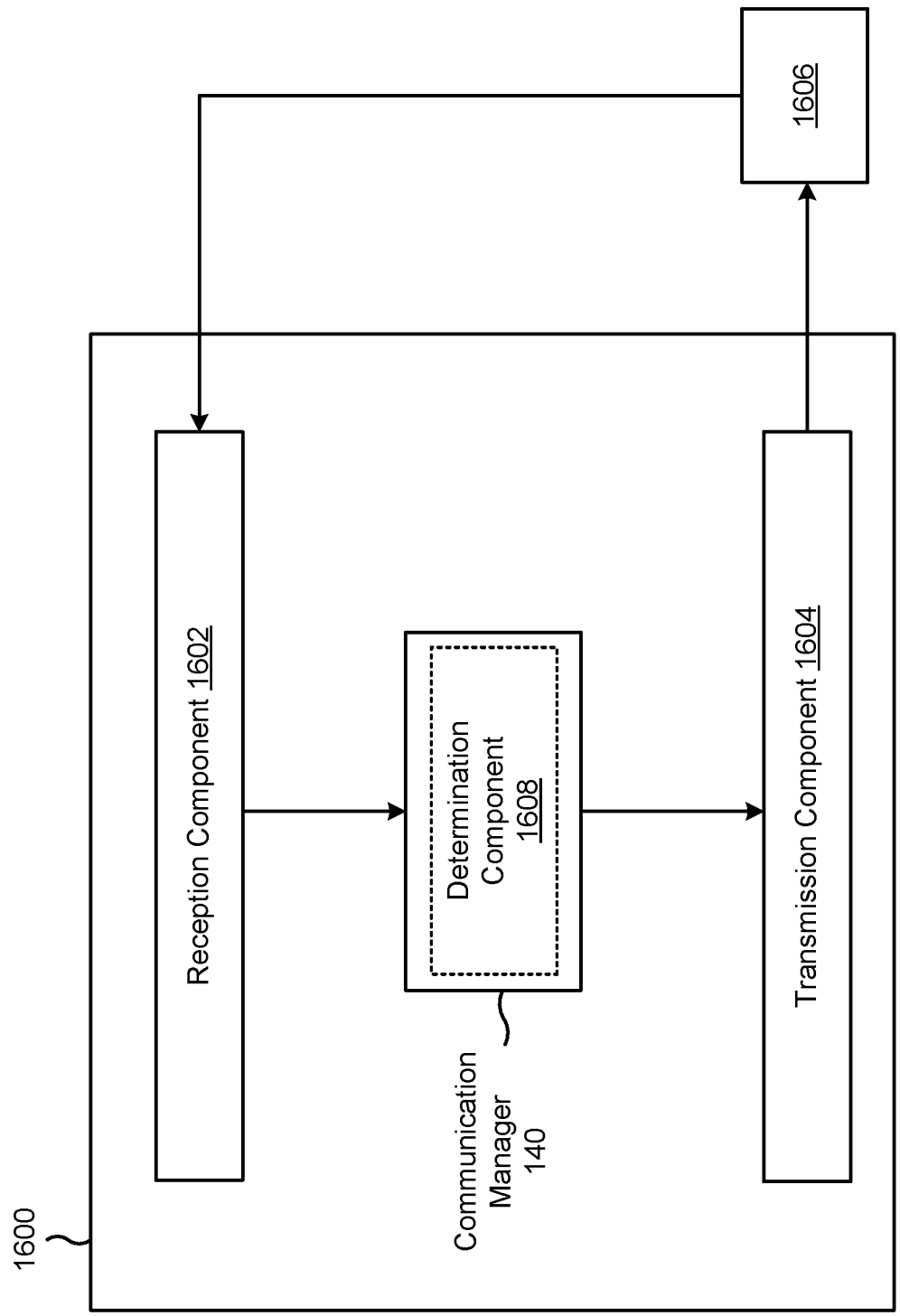
FIGS. 16-17 are diagrams of example apparatuses for wireless communication, in accordance with the present disclosure.

FIG. 16 is a diagram of an example apparatus 1600 for wireless communication. The apparatus 1600 may be a receiver, or a receiver may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140. The communication manager 140 may include a determination component 1608, among other examples.

In some aspects, the apparatus 1600 may be configured to perform one or more operations described herein in connection with FIGS. 9-13. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the receiver described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the receiver described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the receiver described in connection with FIG. 2. In some aspects, the transmission component 1604 may be co-located with the reception component 1602 in a transceiver.

The reception component 1602 may receive, from two or more transmitters, two or more SCIs that schedule COT resources for the two or more transmitters, wherein the two or more SCIs are associated with a same mini-slot or slot. The transmission component 1604 may transmit, to a transmitter of the two or more transmitters and based at least in part on the two or more SCIs, an A/N feedback via a time division multiplexed or a frequency division multiplexed mini-slot carrying a PSFCH or SLFI with SCI, wherein the A/N feedback is transmitted before an LBT and PSSCH transmission. The reception component 1602 may receive, from the transmitter using a COT resource, the PSSCH transmission based at least in part on the A/N feedback, wherein the LBT and the PSSCH transmission are adjustable at the transmitter based at least in part on the A/N feedback.

The reception component 1602 may sense the two or more SCIs during a receiver sensing window. The determination component 1608 may determine a COT resource allocation collision based at least in part on the two or more SCIs sensed during the receiver sensing window.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
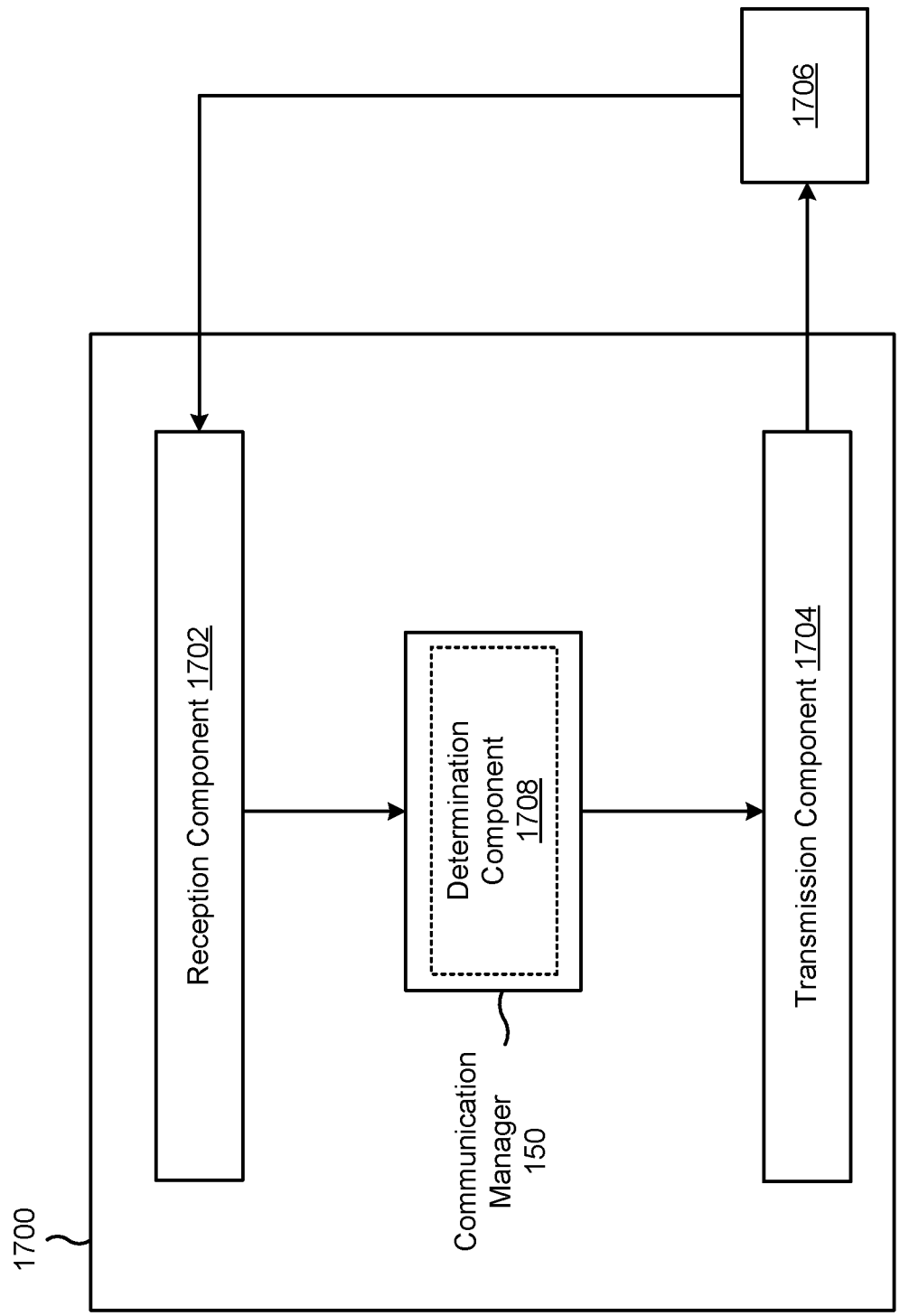

FIG. 17 is a diagram of an example apparatus 1700 for wireless communication. The apparatus 1700 may be a transmitter, or a transmitter may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 150. The communication manager 150 may include a determination component 1708, among other examples.

In some aspects, the apparatus 1700 may be configured to perform one or more operations described herein in connection with FIGS. 9-13. Additionally, or alternatively, the apparatus 1700 may be configured to perform one or more processes described herein, such as process 1500 of FIG. 15. In some aspects, the apparatus 1700 and/or one or more components shown in FIG. 17 may include one or more components of the transmitter described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the transmitter described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the transmitter described in connection with FIG. 2. In some aspects, the transmission component 1704 may be co-located with the reception component 1702 in a transceiver.

The transmission component 1704 may transmit, to a receiver, SCI that schedules COT resources for the receiver, wherein the SCI is included in two or more SCIs that are received at the receiver and are associated with a same mini-slot or slot. The reception component 1702 may receive, from the receiver and based at least in part on the two or more SCIs, an A/N feedback via a time division multiplexed or a frequency division multiplexed mini-slot carrying a PSFCH or SLFI with SCI, wherein the A/N feedback is received before an LBT and PSSCH transmission. The transmission component 1704 may transmit, to the receiver using a COT resource, the PSSCH transmission based at least in part on the A/N feedback, wherein the LBT and the PSSCH transmission are adjustable at the transmitter based at least in part on the A/N feedback.

The determination component 1708 may determine (or perform) a data resource reselection based at least in part on the NACK, the indication of occupied time and frequency resources, and the corresponding RSRP, and where the PSSCH transmission is a rescheduled PSSCH transmission. The determination component 1708 may determine, before transmitting the SCI in an anchor carrier, whether the COT resources are occupied by another transmitter, and whether starting positions are occupied after a transmitter sensing window. The transmission component 1704 may transmit the SCI based at least in part on a modification to a FDRA or to a starting position, or transmit the SCI with a non-conflicting FDRA or TDRA. The determination component 1708 may determine, based at least in part on a sensing performed during a transmitter sensing window, that the COT resource is associated with a collision and that a corresponding RSRP satisfies a threshold. The transmission component 1704 may retransmit the SCI in a previously reserved mini-slot resource with a different FDRA or TDRA or starting position.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a receiver, comprising: receiving, from two or more transmitters, two or more sidelink control informations (SCIs) that schedule channel occupancy time (COT) resources for the two or more transmitters, wherein the two or more SCIs are associated with a same mini-slot or slot; transmitting, to a transmitter of the two or more transmitters and based at least in part on the two or more SCIs, an acknowledgement or negative acknowledgement (A/N) feedback via a time division multiplexed or a frequency division multiplexed mini-slot carrying a physical sidelink feedback channel (PSFCH) or sidelink feedback information (SLFI) with SCI, wherein the A/N feedback is transmitted before a listen-before-talk (LBT) and physical sidelink shared channel (PSSCH) transmission; and receiving, from the transmitter using a COT resource, the PSSCH transmission based at least in part on the A/N feedback, wherein the LBT and the PSSCH transmission are adjustable at the transmitter based at least in part on the A/N feedback.

Aspect 2: The method of Aspect 1, wherein transmitting the A/N feedback comprises transmitting an acknowledgement (ACK) based at least in part on the two or more SCIs not being associated with a same COT resource, wherein the LBT and the PSSCH transmission are associated with an originally scheduled COT resource based at least in part on the ACK.

Aspect 3: The method of any of Aspects 1 through 2, wherein transmitting the A/N feedback comprises transmitting an acknowledgement (ACK) based at least in part on a projected reference signal received power of a jamming transmitter of the two or more transmitters satisfying a threshold, wherein the jamming transmitter transmits an SCI which schedules an overlapping COT resource as a target transmitter of the two or more transmitters.

Aspect 4: The method of any of Aspects 1 through 3, wherein the two or more SCIs associated with the same mini-slot are associated with a same control subchannel and associated with different orthogonal cover codes.

Aspect 5: The method of any of Aspects 1 through 4, wherein transmitting the A/N feedback comprises transmitting a negative acknowledgement (NACK) based at least in part on the two or more SCIs being associated with a same COT resource that causes a COT resource allocation collision, and wherein the LBT and the PSSCH transmission are associated with a rescheduled COT resource based at least in part on the NACK.

Aspect 6: The method of any of Aspects 1 through 5, wherein a resource index and an offset value of the SLFI with SCI is indicated in a data scheduling SCI, and wherein the PSSCH transmission is adjustable based at least in part on the resource index and the offset value of the SLFI with SCI.

Aspect 7: The method of any of Aspects 1 through 6, further comprising: sensing the two or more SCIs during a receiver sensing window; and determining a COT resource allocation collision based at least in part on the two or more SCIs sensed during the receiver sensing window.

Aspect 8: The method of Aspect 7, wherein the receiver sensing window is configured based at least in part on: SCIs in different mini-slots being able to schedule a same data resource, and the SCIs being able to schedule more than one slot for COT resources or a multi-transmission time interval grant.

Aspect 9: The method of Aspect 7, wherein the two or more SCIs include a target SCI, wherein the receiver sensing window ends at a mini-slot of the target SCI, wherein a size of the receiver sensing window is based at least in part on an offset value and a maximum quantity of COT resources, and wherein the size of the receiver sensing window is based at least in part on a maximum offset value configured in a network, an offset value indicated in the target SCI, and a maximum quantity of COT slots or mini-slots permitted per SCI scheduling in the network.

Aspect 10: The method of any of Aspects 1 through 9, wherein transmitting the A/N feedback comprises transmitting a negative acknowledgement based at least in part on an SCI-2 associated with a detected SCI-1 not being decoded, wherein the SCI-2 indicates a single transmission time interval (TTI) grant or a multi-TTI grant over the COT resources, wherein the SCI-2 indicates scheduling parameters, and wherein the SCI-1 indicates a source identifier and a destination identifier.

Aspect 11: The method of any of Aspects 1 through 10, transmitting the A/N feedback comprises transmitting a negative acknowledgement (NACK) based at least in part on a colliding starting position detected in a receiver sensing window among the two or more SCIs associated with overlapping time and frequency resources, wherein a list of conflicting starting positions or last conflicting starting positions for one or more priority classes is transmitted with the NACK in the SLFI with SCI.

Aspect 12: The method of any of Aspects 1 through 11, transmitting the A/N feedback comprises transmitting, in the SLFI with SCI, a negative acknowledgement and an indication of a conflict associated with a time domain resource allocation or a frequency domain resource allocation.

Aspect 13: The method of any of Aspects 1 through 12, transmitting the A/N feedback comprises transmitting, in the SLFI with SCI, a negative acknowledgement (NACK), an indication of occupied time and frequency resources from a receiver sensing during a receiving sensing window, and a corresponding reference signal received power (RSRP), wherein a data resource reselection at the transmitter is based at least in part on the NACK, the indication of occupied time and frequency resources, and the corresponding RSRP, and wherein the PSSCH transmission is a rescheduled PSSCH transmission.

Aspect 14: A method of wireless communication performed by a transmitter, comprising: transmitting, to a receiver, sidelink control information (SCI) that schedules channel occupancy time (COT) resources for the receiver, wherein the SCI is included in two or more SCIs that are received at the receiver and are associated with a same mini-slot or slot; receiving, from the receiver and based at least in part on the two or more SCIs, an acknowledgement or negative acknowledgement (A/N) feedback via a time division multiplexed or a frequency division multiplexed mini-slot carrying a physical sidelink feedback channel (PSFCH) or sidelink feedback information (SLFI) with SCI, wherein the A/N feedback is received before a listen-before-talk (LBT) and physical sidelink shared channel (PSSCH) transmission; and transmitting, to the receiver using a COT resource, the PSSCH transmission based at least in part on the A/N feedback, wherein the LBT and the PSSCH transmission are adjustable at the transmitter based at least in part on the A/N feedback.

Aspect 15: The method of Aspect 14, wherein receiving the A/N feedback comprises receiving an acknowledgement (ACK) based at least in part on the two or more SCIs not being associated with a same COT resource, wherein the LBT and the PSSCH transmission are associated with an originally scheduled COT resource based at least in part on the ACK.

Aspect 16: The method of any of Aspects 14 through 15, wherein the two or more SCIs associated with the same mini-slot are associated with a same control subchannel and associated with different orthogonal cover codes.

Aspect 17: The method of any of Aspects 14 through 16, wherein receiving the A/N feedback comprises receiving a negative acknowledgement (NACK) based at least in part on the two or more SCIs being associated with a same COT resource that causes a COT resource allocation collision, and wherein the LBT and the PSSCH transmission are associated with a rescheduled COT resource based at least in part on the NACK.

Aspect 18: The method of any of Aspects 14 through 17, wherein a resource index and an offset value of the SLFI with SCI is indicated in a data scheduling SCI, and further comprising adjusting the PSSCH transmission based at least in part on the resource index and the offset value of the SLFI with SCI.

Aspect 19: The method of any of Aspects 14 through 18, wherein receiving the A/N feedback comprises receiving a negative acknowledgement based at least in part on an SCI-2 associated with a detected SCI-1 not being decoded, wherein the SCI-2 indicates a single transmission time interval (TTI) grant or a multi-TTI grant over the COT resources, wherein the SCI-2 indicates scheduling parameters, and wherein the SCI-1 indicates a source identifier and a destination identifier.

Aspect 20: The method of any of Aspects 14 through 19, receiving the A/N feedback comprises receiving a negative acknowledgement (NACK) based at least in part on a colliding starting position detected in a receiver sensing window among the two or more SCIs associated with overlapping time and frequency resources, wherein a list of conflicting starting positions or last conflicting starting positions for one or more priority classes is received with the NACK in the SLFI with SCI.

Aspect 21: The method of any of Aspects 14 through 20, receiving the A/N feedback comprises receiving, in the SLFI with SCI, a negative acknowledgement and an indication of a conflict associated with a time domain resource allocation or a frequency domain resource allocation.

Aspect 22: The method of any of Aspects 14 through 21, receiving the A/N feedback comprises receiving, in the SLFI with SCI, a negative acknowledgement (NACK), an indication of occupied time and frequency resources from a receiver sensing during a receiving sensing window, and a corresponding reference signal received power (RSRP), and further comprising performing a data resource reselection based at least in part on the NACK, the indication of occupied time and frequency resources, and the corresponding RSRP, and wherein the PSSCH transmission is a rescheduled PSSCH transmission.

Aspect 23: The method of any of Aspects 14 through 22, further comprising: determining, before transmitting the SCI in an anchor carrier, whether the COT resources are occupied by another transmitter, and whether starting positions are occupied after a transmitter sensing window; and wherein transmitting the SCI comprises: transmitting the SCI based at least in part on a modification to a frequency domain resource allocation or to a starting position, or transmitting the SCI with a non-conflicting frequency domain resource allocation or time domain resource allocation.

Aspect 24: The method of any of Aspects 14 through 23, further comprising: determining, based at least in part on a sensing performed during a transmitter sensing window, that the COT resource is associated with a collision and that a corresponding reference signal received power satisfies a threshold; and retransmitting the SCI in a previously reserved mini-slot resource with a different frequency domain resource allocation or time domain resource allocation or starting position.

Aspect 25: An apparatus for wireless communication at a device, comprising a processor; memory coupled with the processor; and instructions stored in the memory and executable by the processor to cause the apparatus to perform the method of one or more of Aspects 1-13.

Aspect 26: A device for wireless communication, comprising a memory and one or more processors coupled to the memory, the one or more processors configured to perform the method of one or more of Aspects 1-13.

Aspect 27: An apparatus for wireless communication, comprising at least one means for performing the method of one or more of Aspects 1-13.

Aspect 28: A non-transitory computer-readable medium storing code for wireless communication, the code comprising instructions executable by a processor to perform the method of one or more of Aspects 1-13.

Aspect 29: A non-transitory computer-readable medium storing a set of instructions for wireless communication, the set of instructions comprising one or more instructions that, when executed by one or more processors of a device, cause the device to perform the method of one or more of Aspects 1-13.

Aspect 30: An apparatus for wireless communication at a device, comprising a processor; memory coupled with the processor; and instructions stored in the memory and executable by the processor to cause the apparatus to perform the method of one or more of Aspects 14-24.

Aspect 31: A device for wireless communication, comprising a memory and one or more processors coupled to the memory, the one or more processors configured to perform the method of one or more of Aspects 14-24.

Aspect 32: An apparatus for wireless communication, comprising at least one means for performing the method of one or more of Aspects 14-24.

Aspect 33: A non-transitory computer-readable medium storing code for wireless communication, the code comprising instructions executable by a processor to perform the method of one or more of Aspects 14-24.

Aspect 34: A non-transitory computer-readable medium storing a set of instructions for wireless communication, the set of instructions comprising one or more instructions that, when executed by one or more processors of a device, cause the device to perform the method of one or more of Aspects 14-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a receiver, comprising:
one or more memories storing processor-executable code; and
one or more processors coupled with the one or more memories, at least one processor of the one or more processors configured to cause the receiver to:
receive, from two or more transmitters, two or more sidelink control informations (SCIs) that schedule channel occupancy time (COT) resources for the two or more transmitters;
transmit, to a transmitter of the two or more transmitters, an acknowledgement (ACK) in accordance with the two or more SCIs not being associated with a same COT resource, the ACK being transmitted via a time division multiplexed or a frequency division multiplexed mini-slot, the ACK being transmitted before a listen-before-talk (LBT) and physical sidelink shared channel (PSSCH) transmission corresponding to an originally scheduled COT resource; and
receive, from the transmitter, the PSSCH transmission, the PSSCH transmission adjustable at the transmitter according to the ACK.

2. The apparatus of claim 1, wherein the at least one processor, to transmit the ACK, is configured to cause the receiver to transmit the ACK in accordance with a projected reference signal received power of a jamming transmitter of the two or more transmitters satisfying a threshold, the jamming transmitter corresponding to an SCI which schedules an overlapping COT resource as a target transmitter of the two or more transmitters.

3. The apparatus of claim 1, wherein the two or more SCIs are associated with at least one of: a same mini-slot or control subchannel, and different orthogonal cover codes.

4. The apparatus of claim 1, wherein the at least one processor is further configured to cause the receiver to transmit a negative acknowledgement (NACK) in accordance with the two or more SCIs being associated with a same COT resource that causes a COT resource allocation collision.

5. The apparatus of claim 1, wherein a resource index is indicated in a data scheduling SCI, and the PSSCH transmission is adjustable in accordance with the resource index.

6. The apparatus of claim 1, wherein the at least one processor is further configured to cause the receiver to:
sense the two or more SCIs during a receiver sensing window; and
detect a COT resource allocation collision during the receiver sensing window.

7. The apparatus of claim 6, wherein the receiver sensing window is configured in accordance with: SCIs in different mini-slots being able to schedule a same data resource, and the SCIs being able to schedule more than one slot for COT resources or a multi-transmission time interval grant.

8. The apparatus of claim 6, wherein the two or more SCIs include a target SCI, the receiver sensing window ending at a mini-slot of the target SCI, a size of the receiver sensing window being in accordance with an offset value and a maximum quantity of COT resources, and the size of the receiver sensing window being in accordance with: a maximum offset value configured in a network, an offset value indicated in the target SCI, and a maximum quantity of COT slots or mini-slots permitted per SCI scheduling in the network.

9. The apparatus of claim 1, wherein the at least one processor is further configured to cause the receiver to transmit a negative acknowledgement in accordance with an SCI-2 associated with an SCI-1 not being decoded, the SCI-2 indicating a single transmission time interval (TTI) grant or a multi-TTI grant over the COT resources, the SCI-2 further indicating scheduling parameters, and the SCI-1 indicating a source identifier and a destination identifier.

10. The apparatus of claim 1, wherein the at least one processor is further configured to cause the receiver to transmit a negative acknowledgement (NACK) according to a colliding starting position detected in a receiver sensing window among the two or more SCIs associated with overlapping time and frequency resources, a list of conflicting starting positions or last conflicting starting positions for one or more priority classes transmitted with the NACK.

11. The apparatus of claim 1, wherein the at least one processor is further configured to cause the receiver to transmit, in sidelink feedback information (SLFI) with SCI, a negative acknowledgement and an indication of a conflict associated with a time domain resource allocation or a frequency domain resource allocation.

12. The apparatus of claim 1, wherein the at least one processor is further configured to cause the receiver to transmit, in sidelink feedback information (SLFI) with SCI, a negative acknowledgement (NACK), an indication of occupied time and frequency resources from a receiver sensing during a receiving sensing window, and a corresponding reference signal received power (RSRP), a data resource reselection at the transmitter being in accordance with; the NACK, the indication of the occupied time and frequency resources, and the corresponding RSRP, and the PSSCH transmission being a rescheduled PSSCH transmission.

13. An apparatus for wireless communication at a transmitter, comprising:
one or more memories storing processor-executable code; and
one or more processors coupled with the one or more memories, at least one processor of the one or more processors configured to cause the transmitter to:
transmit, to a receiver, sidelink control information (SCI) that schedules channel occupancy time (COT) resources for the receiver, the SCI included in two or more SCIs that are received at the receiver;
receive, from the receiver, an acknowledgement (ACK) in accordance with the two or more SCIs not being associated with a same COT resource, the ACK being transmitted via a time division multiplexed or a frequency division multiplexed mini-slot, the ACK being received before a listen-before-talk (LBT) and physical sidelink shared channel (PSSCH) transmission corresponding to an originally scheduled COT resource; and transmit, to the receiver, the PSSCH transmission, the PSSCH transmission adjustable at the transmitter according to the ACK.

14. The apparatus of claim 13, wherein the two or more SCIs are associated with at least one of: a same mini-slot or control subchannel, and different orthogonal cover codes.

15. The apparatus of claim 13, wherein the at least one processor is further configured to cause the transmitter to receive a negative acknowledgement (NACK) in accordance with the two or more SCIs being associated with a same COT resource that causes a COT resource allocation collision.

16. The apparatus of claim 13, wherein a resource index is indicated in a data scheduling SCI, and the at least one processor is further configured to cause the transmitter to adjust the PSSCH transmission in accordance with the resource index.

17. The apparatus of claim 13, wherein the at least one processor is further configured to cause the transmitter to receive a negative acknowledgement in accordance with an SCI-2 associated with an SCI-1 not being decoded, the SCI-2 indicating a single transmission time interval (TTI) grant or a multi-TTI grant over the COT resources, the SCI-2 further indicating scheduling parameters, and the SCI-1 indicating a source identifier and a destination identifier.

18. The apparatus of claim 13, wherein the at least one processor is further configured to cause the transmitter to receive a negative acknowledgement (NACK) according to a colliding starting position detected in a receiver sensing window among the two or more SCIs associated with overlapping time and frequency resources, a list of conflicting starting positions or last conflicting starting positions for one or more priority classes received with the NACK.

19. The apparatus of claim 13, wherein the at least one processor is further configured to cause the transmitter to receive, in sidelink feedback information (SLFI) with SCI, a negative acknowledgement and an indication of a conflict associated with a time domain resource allocation or a frequency domain resource allocation.

20. The apparatus of claim 13, wherein the at least one processor is further configured to cause the transmitter to receive, in sidelink feedback information (SLFI) with SCI, a negative acknowledgement (NACK), an indication of occupied time and frequency resources from a receiver sensing during a receiving sensing window, and a corresponding reference signal received power (RSRP), the at least one processor being further configured to cause the transmitter to perform a data resource reselection in accordance with: the NACK, the indication of the occupied time and frequency resources, and the corresponding RSRP, and the PSSCH transmission being a rescheduled PSSCH transmission.

21. The apparatus of claim 13, wherein the at least one processor is further configured to cause the transmitter to:
identify, before transmitting the SCI in an anchor carrier, whether the COT resources are occupied by another transmitter, and whether starting positions are occupied after a transmitter sensing window; and
the at least one processor, to transmit the SCI, is configured to cause the transmitter to transmit the SCI according to a modification to a frequency domain resource allocation or to a starting position, or transmit the SCI with a non-conflicting frequency domain resource allocation or time domain resource allocation.

22. The apparatus of claim 13, wherein the at least one processor is further configured to cause the transmitter to:
detect, in accordance with a sensing performed during a transmitter sensing window, that the COT resource is associated with a collision and that a corresponding reference signal received power satisfies a threshold; and
retransmit the SCI in a previously reserved mini-slot resource with a different frequency domain resource allocation or time domain resource allocation or starting position.

23. A method of wireless communication performed at a receiver, comprising:
receiving, from two or more transmitters, two or more sidelink control informations (SCIs) that schedule channel occupancy time (COT) resources for the two or more transmitters;
transmitting, to a transmitter of the two or more transmitters, an acknowledgement (ACK) in accordance with the two or more SCIs not being associated with a same COT resource, the ACK being transmitted via a time division multiplexed or a frequency division multiplexed mini-slot, the ACK being transmitted before a listen-before-talk (LBT) and physical sidelink shared channel (PSSCH) transmission corresponding to an originally scheduled COT resource; and
receiving, from the transmitter, the PSSCH transmission, the PSSCH transmission adjustable at the transmitter according to the ACK.

24. The method of claim 23, wherein transmitting the ACK further comprises:
transmitting the ACK in accordance with a projected reference signal received power of a jamming transmitter of the two or more transmitters satisfying a threshold, the jamming transmitter corresponding to an SCI which schedules an overlapping COT resource as a target transmitter of the two or more transmitters.

25. The method of claim 23, further comprising:
sensing the two or more SCIs during a receiver sensing window; and
detecting a COT resource allocation collision during the receiver sensing window.

26. A method of wireless communication performed at a transmitter, comprising:
transmitting, to a receiver, sidelink control information (SCI) that schedules channel occupancy time (COT) resources for the receiver, the SCI included in two or more SCIs that are received at the receiver;
receiving, from the receiver, an acknowledgement (ACK) in accordance with the two or more SCIs not being associated with a same COT resource, the ACK being transmitted via a time division multiplexed or a frequency division multiplexed mini-slot ACK being received before a listen-before-talk (LBT) and physical sidelink shared channel (PSSCH) transmission corresponding to an originally scheduled COT resource; and
transmitting, to the receiver, the PSSCH transmission, the PSSCH transmission adjustable at the transmitter according to the ACK.

27. The method of claim 26, further comprising:
receiving a negative acknowledgement (NACK) in accordance with the two or more SCIs being associated with a same COT resource that causes a COT resource allocation collision.

28. The method of claim 26, further comprising:
identifying, before transmitting the SCI in an anchor carrier, whether the COT resources are occupied by another transmitter, and whether starting positions are occupied after a transmitter sensing window; and transmitting the SCI comprises: transmitting the SCI according to a modification to a frequency domain resource allocation or to a starting position, or transmitting the SCI with a non-conflicting frequency domain resource allocation or time domain resource allocation; or detecting, in accordance with a sensing performed during a transmitter sensing window, that the COT resource is associated with a collision and that a corresponding reference signal received power satisfies a threshold, and retransmitting the SCI in a previously reserved mini-slot resource with a different frequency domain resource allocation or time domain resource allocation or starting position.

29. The method of claim 26, wherein the two or more SCIs are associated with a same mini-slot being one of four mini-slots corresponding to one slot.

30. The method of claim 26, wherein the two or more SCIs are associated with a same slot comprising at least four mini-slots.

\* \* \* \* \*